(12) United States Patent
Kalogridis et al.

(10) Patent No.: US 9,292,803 B2
(45) Date of Patent: Mar. 22, 2016

(54) APPARATUS AND METHOD FOR PRIVACY-DRIVEN MODERATION OF METERING DATA

(75) Inventors: Georgios Kalogridis, Bristol (GB); Costas Efthymiou, Bristol (GB)

(73) Assignee: Kabushiki Kaisha Toshiba, Tokyo (JP)

(*) Notice: Subject to any disclaimer, the term of this patent is extended or adjusted under 35 U.S.C. 154(b) by 620 days.

(21) Appl. No.: 13/096,272

(22) Filed: Apr. 28, 2011

(65) Prior Publication Data

US 2011/0270453 A1    Nov. 3, 2011

(30) Foreign Application Priority Data

Apr. 28, 2010 (GB) .................................. 1007109.0

(51) Int. Cl.
G06Q 10/00 (2012.01)
G06Q 10/06 (2012.01)
(Continued)

(52) U.S. Cl.
CPC . *G06Q 10/00* (2013.01); *H02J 3/14* (2013.01); *H04L 63/0421* (2013.01); *G06Q 10/0631* (2013.01); *H02J 3/32* (2013.01); *H02J 13/0006* (2013.01); *Y02B 70/3225* (2013.01); *Y04S 20/222* (2013.01); *Y04S 20/38* (2013.01); *Y04S 40/24* (2013.01)

(58) Field of Classification Search
CPC ........ H02J 3/00; H02J 13/0079; Y02E 60/76; Y04S 40/22; Y04S 40/24; G06Q 10/00; G06Q 10/0631; H04L 63/102; H04L 67/125; H04L 67/025
See application file for complete search history.

(56) References Cited

U.S. PATENT DOCUMENTS 6,993,417 B2    1/2006 Osann, Jr.
8,321,064 B2 *  11/2012 Itoh et al. ...................... 700/297
(Continued)

FOREIGN PATENT DOCUMENTS

EP    2 529 461 A1    12/2012
GB    2 455 421 A    6/2009
(Continued)

OTHER PUBLICATIONS

Liang et al., "Load Signature Study—Part I", Apr. 2010, IEEE vol. 25, No. 2, 10 pages.*

(Continued)

*Primary Examiner* — Kenneth M Lo
*Assistant Examiner* — Sunray R Chang
(74) *Attorney, Agent, or Firm* — Oblon, McClelland, Maier & Neustadt, L.L.P.

(57) ABSTRACT

According to an embodiment there is provided a system comprising an input for connecting the system to a power supply, at least one further power source, at least one power consumer, an identifying unit arranged to identify, based on information originating from within the system, an ongoing and/or future power consumption event by the at least one power consumer and a power router that comprises a controller and that is arranged to route power to the power consumer from at least one of the power supply and the at least one further power source, the power router storing rules that define at least part of the routing operation of the router. The power router is arranged to route power to an power consumer in accordance with the rules so that at least a part of the power consumed by the power consumer during the power consumption event is provided by the at least one power source, rather than through the input, in response to the identifying unit identifying a power consumption event.

17 Claims, 8 Drawing Sheets

(51) Int. Cl.
*H02J 3/14* (2006.01)
*H04L 29/06* (2006.01)
*H02J 3/32* (2006.01)
*H02J 13/00* (2006.01)

(56) References Cited

U.S. PATENT DOCUMENTS

| | | | |
|---|---|---|---|
| 2001/0008195 A1* | 7/2001 | Tajima et al. | 187/290 |
| 2003/0050737 A1 | 3/2003 | Osann, Jr. | |
| 2008/0040295 A1 | 2/2008 | Kaplan et al. | |
| 2008/0040296 A1* | 2/2008 | Bridges et al. | 705/412 |
| 2008/0167756 A1* | 7/2008 | Golden et al. | 700/297 |
| 2008/0224892 A1* | 9/2008 | Bogolea et al. | 340/870.3 |
| 2008/0301446 A1 | 12/2008 | Yonge, III et al. | |
| 2009/0045804 A1 | 2/2009 | Durling et al. | |
| 2009/0063228 A1 | 3/2009 | Forbes, Jr. | |
| 2010/0217550 A1* | 8/2010 | Crabtree et al. | 702/62 |
| 2011/0040666 A1* | 2/2011 | Crabtree et al. | 705/37 |
| 2011/0106327 A1* | 5/2011 | Zhou et al. | 700/291 |
| 2011/0282505 A1* | 11/2011 | Tomita et al. | 700/291 |

FOREIGN PATENT DOCUMENTS

| | | | |
|---|---|---|---|
| GB | 2462913 A | | 3/2010 |
| JP | 10-51955 A | | 2/1998 |
| JP | 2003-209939 A | | 7/2003 |
| JP | 2007-20260 A | | 1/2007 |
| JP | 2007-189878 A | | 7/2007 |
| JP | 2008-310729 A | | 12/2008 |
| JP | 2009-015736 A | | 1/2009 |
| JP | 2009-536010 A | | 10/2009 |
| JP | 2011-517261 A | | 5/2011 |
| JP | 2011-155713 A | | 8/2011 |
| JP | 2011-188620 | | 9/2011 |
| WO | WO 2009/105448 A2 | | 8/2009 |
| WO | WO 2009/105448 A3 | | 8/2009 |

OTHER PUBLICATIONS

Office Action issued Jul. 30, 2013 in Japanese Patent Application No. 2011-100463 (with English language translation).

Office Action issued Jan. 7, 2013 in United Kingdom Patent Application No. GB1007109.0.

Office Action issued Aug. 13, 2012 in United Kingdom Patent Application No. GB1007109.0.

Combined Office Action and Search Report issued Sep. 1, 2010 in United Kingdom Patent Application No. GB1007109.0.

All Ipakchi et al., "Grid of the Future: Are We Ready to Transition to a Smart Grid?" IEEE Power and Energy Magazine, vol. 7, No. 2, Mar./Apr. 2009, pp. 52-62.

Annabelle Lee, et al., "Smart Grid Cyber Security Strategy and Requirements" National Institute of Standards and Technology, Draft NISTIR 7628, Sep. 2009, 236 Pages.

"AMI System Security Requirements" Technical Report UCAIUG: AMI-SEC-ASAP, vol. 1, No. 1, Dec. 17, 2008, 111 Pages.

Elias L. Quinn, "Privacy and the New Energy Infrastructure" Feb. 2009, 42 Pages http://papers.ssrn.com/sol3/papers.cfm?abstract_id=1370731.

Christopher Laughman, et al., "Power Signature Analysis" IEEE Power and Energy Magazine, Mar./Apr. 2003, pp. 56-63.

George W. Hart, et al., "Nonintrusive Appliance Load Monitoring" Proceedings of the IEEE, vol. 80, No. 12, Dec. 1992, pp. 1870-1891.

H.Y. Lam, et al., "A Novel Method to Construct Taxonomy of Electrical Appliances Based on Load Signatures" IEEE Transactions on Consumer Electronics, vol. 53, No. 2, May 2007, pp. 653-660.

A. Prudenzi, "A Neuron Nets Based Procedure for Identifying Domestic Appliances Pattern-of-Use from Energy Recordings at Meter Panel" IEEE Power Engineering Society Winter Meeting, vol. 1, 2002, pp. 941-946.

Rebecca Herold, "Smart Grid Privacy Concerns" Privacy Professor, Oct. 2009, 3 Pages http://www.privacyguidance.com/files/SmartGrid_PrivacyHeroldOct2009.pdf.

"The solarwave smart sub-meter" Solarwave, Aug. 3, 2010, 2 Pages http://www.solarware.ie/HowItWorks.htm.

Mark F. Foley, "The Dangers of Meter Data (Part 1)" smart grid news.com, Jun. 2, 2008, 3 Pages http://www.smartgridnews.com/artman/publish/industry/The_Dangers_of_Meter_Data_Part_1.html.

Brian Krebs, "Experts: Smart grid poses privacy risks", Security Fix, 2010, 4 pages, http://voices.washingtonpost.com/securityfix/2009/11/experts_smart_grid_poses_priva.html.

Washington Post, http://information-security-resources.com/2009/11/15/fifteen-more-smart-grid-privacy-concerns, 2009 (copy not available, submitting Statement of Relevancy only).

* cited by examiner

APPARATUS AND METHOD FOR PRIVACY-DRIVEN MODERATION OF METERING DATA

This application is based upon and claims the benefit of priority from United Kingdom patent application No. 1007109.0, filed on 28 Apr. 2010; the entire contents of which are incorporated herein by reference.

FIELD

Embodiments described herein relate generally to an apparatus and method for enhancing privacy in an end consumer of power. Embodiments described herein also relate to a way of modifying information that is made available to a smart meter.

BACKGROUND

Smart grids are an emerging engineering challenge. A discussion of the forms a smart grid can take can be found in A. Ipakchi and F. Albuyeh. Grid of the future. IEEE Power and Energy Magazine, 7(2):52-62, 2009. A smart grid may be viewed a system that itself unifies a number of sub-systems. A smart grid further merges multiple engineering technologies, such as electric power and control systems and telecommunication and information technology systems.

A smart grid is considered to intelligently integrate and optimise the functionalities of its components, to efficiently deliver sustainable, economic and secure electricity supplies. It may employ products and services together with monitoring, control, communications and self-healing technologies to offer a wide range of new services, such as improved grid connectivity, optimised consumer power supply or power reserve, improved customer services, control of the environmental impact and enhanced levels of reliability and security of supply.

Smart grids moreover differ from common (legacy) grids in that they interconnect smart grid components with a two-way communications network. This two-way connection enables energy suppliers and customers to exchange information, if required in an interactive and/or real-time manner. Information exchange of this nature can support features such as load shedding, consumption management, distributed energy storage (e.g. in electric cars) and distributed energy generation (e.g. from renewable resources). The communications network could be implemented using a variety of media. The network can, for example connect a smart meter placed in a home with a control centre, such as the control centre of an energy provider using fibre optics or broadband connections. Within the home a Zigbee connection or a WLAN (or indeed any other suitable form of home networking) can find use.

Smart grids may further use an advanced metering infrastructure (AMI) for automated meter reading (AMR). The role of smart meters in an advanced metering infrastructure is pivotal. Smart meters, which are usually electrical meters but could also incorporate other metering devices, such as device metering gas, water and/or heat consumption, measure power consumption in much more detail than conventional meters. It is moreover anticipated that future smart meters will have the ability to communicate collected information to third parties, in particular the provider of a utility in question, i.e. the electricity provider.

A smart meter may also potentially communicate with a number of appliances and devices within future 'smart-homes', for example via a home area network (HAN). Information obtained in this manner can be important to the smart grid and/or its operator(s) in managing energy supply, distribution and usage, or, put more generally, in further optimising the functionalities of the smart grid's components. Home Area Network is also suitable for allowing the transmission of information, such as operational information from smart appliances within a home to a smart meter at as fine a level of granularity as required/desired.

The information security of smart grid data and advanced metering data is of paramount importance. Implementing and analysing smart grid security is a challenging task, especially when considering the scale of the potential damages that could be caused by attacks and by the compromising of advanced metering data. A classification of smart grid risks and vulnerabilities has been published by the National Institute of Standards and Technology (NIST) (see A. Lee and T. Brewer, "Smart grid Cyber Security Strategy and Requirements. Technical Report DRAFT" NISTIR 7628, The Cyber Security Coordination Task Group, Advanced Security Acceleration Project, National Institute of Technology, September 2009). In addition, a comprehensive specification of Advanced Metering Infrastructure security requirements has been published by OpenSG ("AMI System Security Requirements", Technical Report AMI-SEC TF, OpenSG, December 2008).

The dangers of metering data to privacy have been widely discussed (see, for example, stories published by Smart Grid News.com (http://www.smartgridnews.com/artman/publish/industry/The_Dangers_of_Meter_Data_Part_1.html) by the Washington Post (http://voices.washingtonpost.com/securityfix/2009/11/experts_smart_grid_poses_priva.html), another story published at http://information-security-resources.com/2009/11/15/fifteen-more-smart-grid-privacy-concerns and papers by Quinn ("Privacy and the New Energy Infrastructure", available at http://papers.ssrn.com/sol3/papers.cfm?abstract_id=1370731) and P. McDaniel, and S. McLaughlin, ("Security and Privacy Challenges in the Smart Grid", IEEE Security & Privacy, 75-77, 2009). Quinn argues that in the future advanced metering Infrastructure will provide a window into the activities within homes, exposing once private activities to anyone with access to electricity usage information. As more and more detailed data about home energy usage is pouring into utilities, the resolution and quality of information that can be gleaned from that raw data is increasing. Quinn moreover argues that modern analytical techniques can, based on an electricity usage profile, identify the use of individual appliances within homes, and will in the foreseeable future be able to pinpoint exactly who, how, and when has someone operated these home appliances. For example, it may be possible to recognise when a resident showers, watches TV, and goes to bed in the night.

Despite the threats to users' privacy, it is envisaged that more detailed power usage information will be required in the future to:
  To enable demand response functionality and sustainable load management.
  To accommodate variable input from renewable resources.
  To drive consumer actions through awareness and social pressure with demand-side management.

The granularity of the data acquired by smart meters may vary widely. The Solarwave Smart Sub Meter, for example (see http://www.solarwave.ie/HowItWorks.htm) meters power consumption at fifteen-minute intervals as a default but is capable of taking data every minute.

The information that can be gleaned from the processing of power profiles that can be generated by smart meters and subsequently provided to utility companies can currently be demonstrated with the use of non-intrusive appliance load monitors (NALM) (see, for example, C. Laughman et al., "Advanced Nonintrusive Monitoring of Electric Loads, IEEE Power and Energy, 56, March/April 2003). Non-intrusive appliance load monitors can be used for constructing appliance models. Appliance models can be separated into two basic types: on/off models, and finite state machine models. Appliance models can then be used to track appliance behaviour, as illustrated, for example, by G. W. Hart in "Nonintrusive Appliance Load Monitoring", 80 Proceedings of the IEEE 1870, 1871-72, December 1992.

There is moreover a rich and ongoing line of research in the construction and upkeep of appliance libraries and detection algorithms, as illustrated, for example, by H. Y. Lam & W. K. Lee in "A Novel Method to Construct Taxonomy of Electrical Appliances Based on Load Signatures", 53 IEEE Transactions On Consumer Electronics 653, 2007. By way of example, FIGS. 1 and 2 show two signature load profiles (with different time granularity) for a house, from which a large amount of personal information can be extracted, as indicated.

Even when household power profiles are aggregated, researchers have shown (with the use of artificial neural networks) that they can pinpoint the use of washing machines, dishwashers and water heaters with accuracy rates of over 90% from within the noise of the aggregated load information (see, for example, A. Prudenzi, "A Neuron Nets Based Procedure for Identifying Domestic Appliances Pattern-of-Use from Energy Recordings at Meter Panel", IEEE Power Engineering Society Winter Meeting 941, 942 col. 1, 2002).

The full extent of privacy concerns is not yet fully understood. A good list of privacy threats is given by Rebecca Herold (from NIST) and can be found at http://www.privacyguidance.com/files/SmartGrid_PrivacyHeroldOct2009.pdf. These considerations have been neatly summarised in a report from a NIST expert: "The major benefit provided by the Smart Grid, i.e. the ability to get richer data to and from customer meters and other electric devices, is also its Achilles' heel from a privacy viewpoint."

At present attempts to protect smart metering data appears to be almost exclusively focussing on policy formulation and enforcement in the domains that will be managing this data, for example in the utility provider domain.

BRIEF DESCRIPTION OF THE DRAWINGS

Embodiments will be described in the following by way of example only and with reference to the accompanying drawings, in which.

DETAILED DESCRIPTION OF EMBODIMENTS

Figure 1:
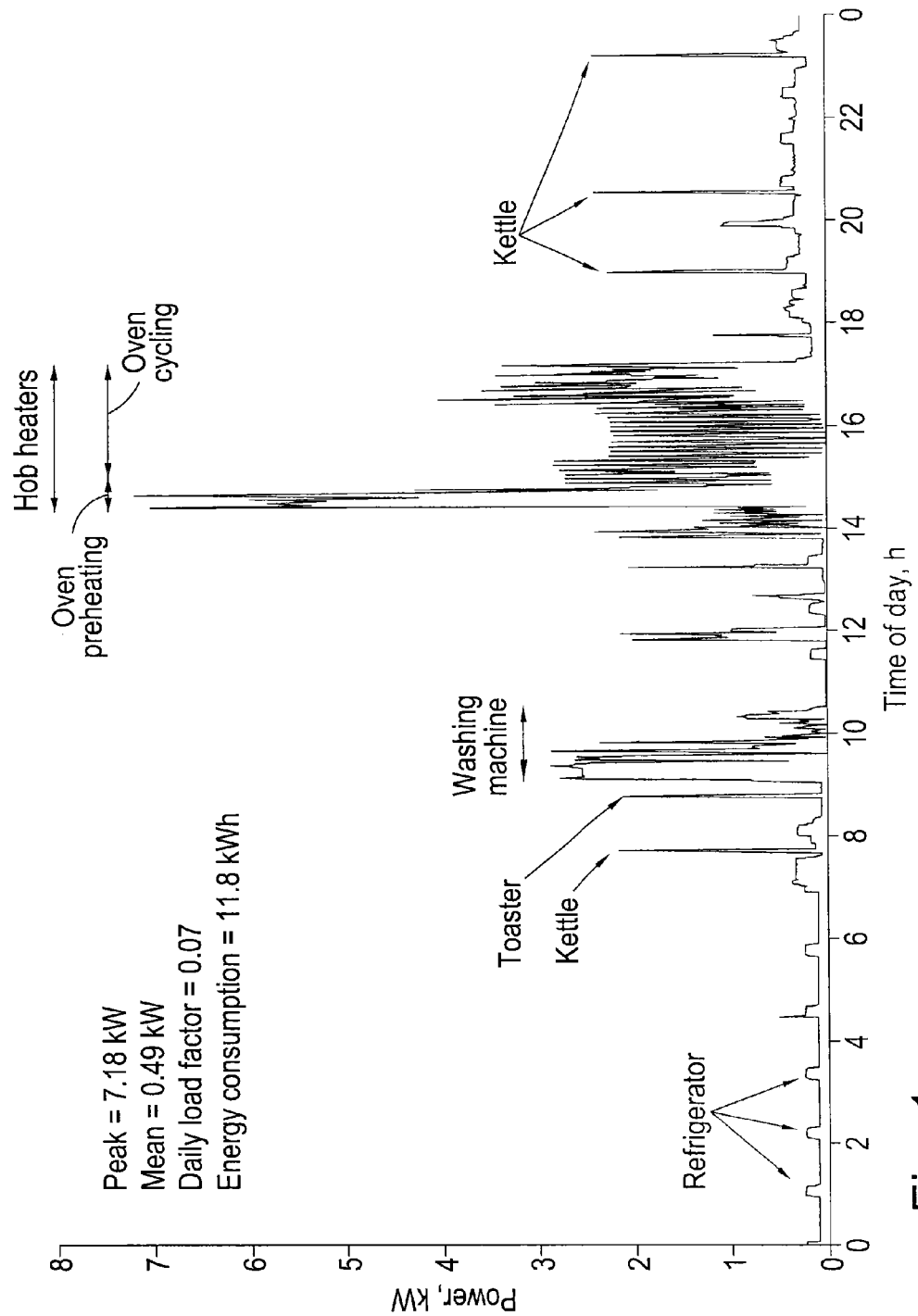
FIG. 1 shows a Household Load Signature recorded on a one-minute time base.

According to an embodiment there is provided a system comprising an input for connecting the system to a power supply, at least one further power source, at least one power consumer, an identifying unit arranged to identify, based on information originating from within the system, an ongoing and/or future power consumption event by the at least one power consumer and a power router that comprises a controller and that is arranged to route power to the power consumer from at least one of the power supply and the at least one further power source, the power router storing rules that define at least part of the routing operation of the router. The power router is arranged to route power to an power consumer in accordance with the rules so that at least a part of the power consumed by the power consumer during the power consumption event is provided by the at least one power source, rather than through the input, in response to the identifying unit identifying a power consumption event.

The input for connection the system to a power supply can be a connection to a power grid that may comprise a smart meter. When referring to a smart meter, the present disclosure makes reference to a metering device that is provided to measure the power consumption of the system and that can provide at least information of power consumption over time, as for example shown in FIGS. 1 and 2, to a third party on the power grid, such as to a utility provider or a grid operator. The smart meter may further be arranged to accept commands sent through the grid, for example, from the utilities provider or the grid operator, and to attempt to implement these commands inside the meter area/the end consumer, i.e. demand-side management. Similarly, the smart meter may be arranged to bi-directionally communicate with (and be controlled by) system appliances or user devices. Customers of utility providers will own a number of energy consuming devices located in the same building or part of the building. The energy consuming devices tend not to be monitored individually but in combination with each other through a power meter provided between the power grid and the building. Although it is possible to identify the activity of individual devices using smart metering data, as discussed above, the entire metered unit, be that a house, part of a house, a home or a commercial building, can be considered the end consumer, as seen by the utility provider. The system can be located at the consumer side of the smart meter that is on the side of the smart meter that the smart meter is intended to monitor. The system may be an end consumer of power supplied through the power supply and can be a building or house, be provided or located within a building or house, be part of a building or house, be provided/located within a part of a building or house, be a household or form part of a household or be any other power consumer unit that may be individually monitored using a smart meter.

The system allows modifying the load signature of individual power consumption events by using locally generated and/or stored power for satisfying the power demands of the power consumption event. In doing so the system simply alters the outward appearance of the power consumption event, as not all of the power consumed is drawn from the power grid, modifying it to make it more difficult to draw conclusions on the nature of the power consumption event that has contributed to the load signature, while still satisfying the power demand. It will be appreciated that this alteration of the outward appearance of the consumption data addressed the above discussed privacy problem at its source by never allowing sensitive data to be created. The user's experience of the system does thus not have to be compromised or even altered and the operation of the system can thus be entirely transparent to the user. Apart from its user privacy benefits, the proposed system also provides benefits the grid and the utility providers, as better shaped (e.g. smoother) load signatures can contribute to the grid's efficiency, stability, and sustainability.

The system relies on information originating from within the system for identifying power consumption events. This information may include power triggers generated by the identifying means, the power router or even a consumer side of the smart meter. For example, this information may include electrical signals generated by electrical power events such as changes in power consumption, which may be detected following digital processing of electrical metering data (which processing may take place within a chip, or with firmware, or even with computer software)—alternatively, electrical power events may be detected with electromechanical methods. The information may additionally or alternatively comprise digital data information, such as activation information, transmitted to the system from a smart appliance, for example via a wireless communication link and/or a home area network. The operation of the system is therefore autonomous and can therefore be rendered undetectable to the utility provider or grid operator. In particular there is no need to rely on information received from a utility provider or other entity through the power grid.

The rules may be defined by a person responsible for or authorised to operate the system. The system may comprise an input means to allow such a person or user to input rules for storage in the system, advantageously in the power router.

The power router may further comprise a routing switch. The routing switch can be connected to the at least one power consumers, to the at least one further power source and to the input. The routing switch can be arranged to route power to the at least one power consumer from one or more of the at least one further power source and the input. The processor can be arranged to control the routing switch in accordance with the rules. The routing switch may be arranged to allow connection between any and all of the power consumers and the further power sources within the system and of any and all of these power consumers and further power sources to the input. It is further envisaged that multiple further power sources are connected to a single or to multiple power consumers or to the input. It is equally envisaged that multiple power consumers can be connected to a single further power source by the routing switch.

The controller and the routing switch may be provided in a single physical unit. Alternatively the controller and routing switch may be provided as separate units. This is particularly advantageous in situations where a routing switch is already present in a building/household/end consumer, for example in a building that already comprises alternative energy sources. Such building may already comprise a routing arrangement, which could be modified to be controlled by the above mentioned power router controller, in particular if the routing arrangement is of a known commercial type to which the controller can interface in a standardised manner.

If the controller is physically separate from the routing switch, then it can comprise an output for connection to and communicating with a power router. The controller may further comprise an input for receiving connection information that indicates which further power sources and power consumers (located on the consumer side of the smart meter) are connected to the power router. This information may be stored in a memory that is either in the controller or that the controller can at least access. The controller can further comprise and identifying means for identifying an ongoing and/or future power consumption event by a said power consumer.

The controller can further be arranged to generate, in response to the identifying means identifying a power consumption event, control signals for transmission to the power router through the output. The control signals are suitable for controlling the power router such that at least a part of the power consumed by the said power consumer during the power consumption event is routed to the power consumer from at least one of the power sources located on the consumer side of the smart meter.

If the apparatus and router are provided as physically separate entities the control signals can be control commands. It will, however, be appreciated that, if the apparatus physically includes the router, then the control signals can be control signals provided on electric connections between the controller and the power router, such as signal levels that do not necessarily have to be formatted according to a command protocol. Control signals can also be software triggers, if aspects of the controller and the power router control mechanisms are implemented in software.

The controller can be arranged to control the power router so that a load signature of the power consumption event is modified through the use of power from at least one of the power sources in a manner that the load signature, as seen at the input is one or more of smoothed, shortened in duration, lengthened in duration, randomly scrambled, completely hidden and split into several distinct power consumption events, when compared to an actual load signature of the power consumption event. The manner in which the controller controls the power routing by the power router can also vary over the duration of the power consumption event. For example, a power consumption even that involves consumption of a constant amount of power over time can be modified by routing different amounts of power from local/further power sources to introduce edges into the load signature. Alternatively, switching edges that may be considered characteristic for the power consumption of a particular power consumer may be modified to change their appearance through the use of power provided from local power sources.

The determining means can comprises an input for receiving notifications of ongoing and/or future power consumption events from a smart appliance located on the consumer side of the smart meter or from the smart meter itself. Receiving notifications from a smart meter is particularly feasible if the smart meter itself provides an internal separation between received data (which is required to remain secret but which forms the basis for providing data to the grid) and modified data that is provided to the grid. The received data may be used for sending notifications to the controller of the system.

If the system operates based on the above discussed notifications then it can proactively determine a routing plan for future/notified power consumption events, if these power consumption events have been notified in good time for the controller to generate such a routing plan. The controller may store information relating to notified events to enable scheduling of routing activities. The system can, however, fulfil its routing task even if notifications of power consumption events are received very close to or even after the commencement of the event. In this case the operation of the system will be reactive, rather than proactive. It will be appreciated that it is likely that a system will at least in part operate reactively, in particular if one or more of the power consumers in the system is not able to provide scheduling information relating to future power consumption events, be that because the power consumer does not have the technical ability to provide such information or be that because the power consumption event had simply not been scheduled/planned.

The power router can be arranged to route power in accordance with the rules within a short time, for example less than one minute from the detection of the beginning of an ongoing power consumption event. More advantageously, the power router can be arranged to react to the detection of an ongoing power consumption event within 10 s of the detection. The power router can particularly be arranged to react by configuring power routing in a time frame that is shorter than the reporting period of the smart meter. Thus, even in situations where the system operates in a reactive fashion an initially unmoderated ongoing power consumption event may not be detected as such by a smart meter.

The determining means can additionally or alternatively comprise a sensor for detecting a change, such as an increase, in ongoing power consumption. Such a sensor may be a sensor that can be placed in or around a power supplying cable in a manner that allows the sensor to detect ongoing power supply or even a level/intensity of an ongoing power consumption. The sensor can additionally or alternatively be used to monitor the home load signature and/or a load signature of an appliance/power consumer. It will be appreciated that, while the identity of the power consumer may be known to the apparatus, such knowledge is not essential. The system can operate without such knowledge, by simply moderating an ongoing power consumption event.

The controller may moreover be connected to or even comprise an input or communications interface for data communication with one or more of the at least one power consumer. The interface enabling the apparatus to communicate with smart appliances may comprise one or more input ports for connecting to the smart appliances using wired connections. More advantageously, however, the input port may support a wireless connection to smart appliances (such as WLAN, or Zigbee), for example by accepting wirelessly transmitted short messaging service messages or information conforming to any other format suitable for wireless transmission. It can moreover be envisaged that the apparatus connects to smart appliances in an indirect manner, for example by communicating with the smart appliances via a Femtocell gateway that may already be present in the household or building, through another type of home area network or through the smart meter.

Status information that a smart appliance may transmit to the apparatus can include, amongst other information, a schedule of upcoming power consumption events and, if the smart appliance is a power storage device, the amount of charge remaining in the power storage device, a maximum amount of power that can be provided by the smart appliance (for example a maximum discharge current), maintenance information (for example information of a desired or optimal discharge/recharge frequency), a maximum charging current, a typical charging and discharging behaviour over time etc. More advantageously, if the power storage device is part of and is supplying an electric vehicle, it may communicate scheduled storage requirements (e.g. in the context of scheduled transportation plans).

Power storage devices are important power sources for enhancing privacy/modifying the load signature. Power storage devices can provide power to the power consumer, through power router under the direction and control of the controller, during the power consumption event and can be partially or totally re-charged during the power consumption event or once the power consumption event has been terminated. At least the re-charging operation of the power storage device will leave a trace in the load signature of the system if grid power is used for re-charging. This trace, however, can be provided at a different time from the power consumption event and can be arranged to have a shape that differs considerably from a load characteristic of a power consumer in question or of the power consumption event itself. The power router may be arranged to commence re-charging of power storage devices a period of time after the end of the power consumption event, so that the total grid power consumption associated with the power consumption event becomes evident in the load signature of the event as more than one discrete event, thereby decreasing a likelihood of correct identification of the type of power consumption event. In one arrangement a re-charging operation may be undertaken in several discrete steps to hide the complete power consumption operation further. The power router can be arranged to control the routing of power to and from power storage devices to facilitate the use of stored power and the re-charging of the storage devices. It should be noted here that power storage devices may store power in a way that cannot be retrieved in an electrical form, e.g. storage heaters.

These powers sources may include re-chargeable power sources, such as batteries or vehicles comprising batteries, as well as power generators, such as locally installed alternative energy sources, e.g. photovoltaic panels, wind turbines or a fuel cell. Power from two or more of such power sources may be jointly routed to a power consumer.

The power router may further be arranged to vary a portion of power routed from a power source identified by the connection information to the said power consumer over time. Such a temporal variation in the amount of power routed from one of the power sources can allow the apparatus to take the charging state of and/or the discharging preferences associated with a power source into account. If the apparatus, for example, comprises a record indicating a maximum amount of power that can be provided by a power source and/or an optimum/desired discharge curve of a power storage device, then the apparatus can instruct the power router to provide power from another power source (be that another one of the power sources identified in the connection information or grid power) to compensate for an amount of the required power that a sole power source cannot or should not provide.

Varying the amount of power that is provided by one or more of the power sources identified in the connection information moreover provides the advantage of being able to temporally vary the amount of power drawn from the grid. This in turn allows the power consumption recorded by the smart meter to be modified in a manner that renders a load signature created by power consumption event and recorded by the smart meter non-typical for the power consuming entity. By temporally varying the fraction of the total power consumed by the power consumption event it is in particular possible to modify an edge of the load signature created by the commencing or terminating of the power consumption event. This can contribute to rendering a household's or building's load signature more resistant to data analysis algorithms that identify consumption of power by a particular consumer/appliance by analysing edges in the load signature created by switching.

By way of example, the controller may be arranged to control the power router to provide all of an amount of power that is initially consumed by the power consumer from a power source on the consumer side of the smart meter and part or all of the power consumed at a later stage from the grid. A transition between these two states can be gradual, or even linear, or may be a sudden transition between the two states. Any such sudden transition may be performed in a single step or in several steps.

The controller can further be arranged to control the power router to supply power to a power consumer so that the load signature of the power consumption event, as seen by the smart meter/at the input, differs from a typical load signature of the power consumer in at least one of an amplitude or intensity of the power consumed, a total amount of power consumed, a slope of an edge of the load signature, a duration of power consumption and a timing of the power consumption event. The typical load signature may be stored so as to be accessible by the controller, so that the controller can determine how to modify the power routing to alter a resulting load signature of the system, such that the resulting load signature differs from the stored, typical load signature.

It is, for example, envisaged that for part or all of the power consumption event, the amount of power consumed from the grid does not correspond to the required power, so that an amplitude of the power consumption, as seen in the load signature of the power consuming event, is reduced for part or all of the power consuming event. It is also envisaged that part of the consumed power is provided by power generators located at or connected to the consumer side of the smart meter, so that the overall amount of power drawn form the grid is less that the overall amount of power required by the power consumption event. A typical load signature of a power consuming event may have specific timing characteristics. Examples of this can be seen in FIG. 1. The apparatus may alter such characteristic timing by causing the power router to supply part or all of the power consumed during the power consumption even from power sources that are located on or connected to the consumer side of the smart meter, so that the load signature associated with the duration of the power consumption event is distorted when compared with the typical load signature of a power consumption event of the device in question. Any re-charging of power storage devices that may have been depleted during the power consumption event may then be performed during or after the end of the power consumption event, or even after a period of time following the power consumption event in which not re-charging is performed. Any re-charging activity is thus more likely to express itself in a load signature provided by a smart meter as one or more separate events that appear independent from the power consumption event that has given rise to them.

The controller can moreover be arranged to control the power router to supply power to a power consumer so that the load signature of the power consumption event, as seen by the smart meter/at the input, corresponds to a typical load signature of a power consumer other than the power consumer consuming power in the power consumption event. Typical load signatures useable for this purpose may again be stored in a memory accessible by the controller.

The predetermined rules can comprise at least one of a rule defining one or more power consumers and/or types of power consumption events for which a load signature, as seen at the input, is to be modified, a ranking of different power consumers and/or types of power consumption events, wherein the ranking determines an importance of modifying a load signature associated with the ranked consumer or event type, rules specifying preferred times for power consumption through the input, and rules specifying power consumption preferences for one or more of the at least one further power sources. It will be appreciated that a system comprising the above discussed variety of rules provides a framework for managing complex power usage optimisation operation at an end user, which may be much needed for a sustainable and economic smart grid operation. This framework may further be suitable for use in non-security/non-privacy related home energy resource management, such as cost-saving energy optimisations.

The rule defining one or more power consumers and/or types of power consumption events for which a load signature, as seen at the input, is to be modified, allow the controller to determine the likelihood of a threat to the privacy of the system. If a particular type of power consumption even or a particular power consumer is not listed by the rule, then the controller may safely conclude that outside knowledge of the event or activity of the consumer is not objectionable and may adjust the routing function of the power router accordingly, for example by not using any locally available power, for example power in storage. In this case locally generated power, e.g. wind or solar power may also be fed back into the grid to make use of benefits that may be available from feed in tariffs. Equally, however, if an identified power consumption event or power consumer is listed as being privacy sensitive, then the controller may determine that the routing of power associated with the event should be undertaken to modify the load signature generated at the input. The application of these rules may be considered a way of detecting a privacy threat.

By ranking consumption event types and/or consumer type the system can allocate known available local power resources to scheduled future events. The apparatus may be arranged to determine whether or not power available from the power sources located at or connected to the consumer side of the smart meter is sufficient for supplying all scheduled events. Should the apparatus determine that the amount of power that is available is not sufficient, then the apparatus can determine which of the power consumption events or power consumers should simply obtain all or most of the required power from the grid/through the input, rather than from local sources. The ranking thus provides a guideline to the apparatus of those consumption events or consumer types for which a user is more willing to compromise privacy, and which events should be treated preferentially in terms of privacy protection. The ranking may, however, not only find use in preferring one power consumption event or power consumer over another power consumption event or consumer in situations in which there are insufficient local power resource for modifying the load shape. The ranking may also be used as an indication of the importance of providing privacy for a power consumption event and may form the basis for determining how strongly the load shape created by the power consumption event should be modified. The controller may, for example, determine a target load signature that is to be implemented and check, based on the ranking, if a degree of privacy afforded by the modified home load signature is adequate.

Specifying preferred times for power consumption from the grid, allows users to modify the privacy enhancement arrangement so that they can be implemented cost effectively. A user may, for example specify that the re-charging of batteries should preferentially take place when grid power is at a low price, such as late at night, while the feeding in of power to the grid should be performed at times of the day when a price paid for the power is high.

By specifying power consumption preferences the apparatus can make a contribution to the maintenance of the power sources as well as to running the household or building in a cost effective manner. For example the power consumption preference of a battery may, for example, specify a preferred charge and discharge rate and/or frequency that is suitable for preserving the maximum storage capacity of the storage device. The preferences may further relate to local power generators and can determine a preferential feeding in of generated power to the grid at times when the power price that can be achieved is high and the use of the generated power for re-charging of storage devices at other times. These rules can moreover specify minimum and/or average charges that ought to be retained in a storage device.

The system may further comprise an input for receiving rules updates. The controller can update stored rules in accordance with a received rules update. The rules can thus be adapted to new requirements. The rules update may, for example, be received at the controller through an interface with a home area network, in which a user may have defined the rules update so that the rules correspond to current privacy requirements. It is of course also envisaged that rules updates may be received through the input of the system, for example from a utilities provider. Rules received in this manner may, for example be those comprising pricing information.

The power router can comprise an input means for receiving commands from the smart meter or through the said smart meter and can be arranged to generate output signals for putting received command into effect. The controller may give preference to commands received from or through the smart meter, in accordance with conditions a utility provider may impose on the end consumer, for example to facilitate control functions that allow load shedding, to satisfy peak reduction demands issued by the utilities provider etc. The controller may be arranged to allow any such received commands to override conditions on load shaping defined by the stored rules. The input means can be the same means as that used for wirelessly interfacing to smart appliances, if implemented.

The system may further comprise a load shape generator that is arranged to determine a desired load shape in conformity with one or more or all of the stored rules for use with a scheduled and/or a currently ongoing power consumption event. When refereeing to a load shape reference is being made to a planned contribution the power consumption event is intended to make to the household's/end consumer's load signature, as seen at the input of the system. The load shape generator can be arranged to receive and/or acquire information of the amount of power available from the at least one further power source for use in implementing load shapes. The load shapes can then be determined taking the available power into account. The load shape generator may store several possible or predetermined load shapes and select an appropriate load shape based on the amount of power available from the further power sources. Determining the future availability of power from the further power sources may include taking into account a weather forecast to estimate the likely amount of power available from a solar panel and/or a wind turbine.

In addition to modifying the pattern of the power consumed from the grid, the controller of the power router, or another controller in the system, may further be arranged to receiving data from one or more of the at least one further power source and/or the at least one power consumer and to modify the received data in accordance with stored rules. The rules can prescribe how the received data is to be anonymised. The modified data can then be provided to a transmitter, for example for transmission to a smart meter. The controller may take the place of the smart meter as a recipient of the appliance data, so that the appliance data does not or cannot reach the smart meter in an unmodified form. The anonymised or even the received data may further form the basis for the operation of a load shaping scheduler that schedules routing operations to meet the demands of future scheduled power consumption events.

The controller can further comprise a routing scheduler. The routing scheduler may determine fractions of a total amount of power that is to be routed to a power consumer from one or more of the at least one further power source in scheduled future power consumption events. The routing scheduler allows to proactively schedule routing events in accordance with the user's privacy requirements, as defined by the rules. The operation of the routing scheduler may be based on available information of the amount of power that can be provided form the further power sources in the future. Such information may be obtained in any of the above discussed ways.

According to another embodiment there is thus provided a system comprising a smart meter connectable to a power grid and a data anonymiser. The data anonymiser comprises a communication interface for receiving application data from smart appliances. The smart meter is arranged to receive application data in a predetermined format. The anonymiser is arranged to modify received data in accordance with stored privacy rules and to forward the modified data to the smart meter in the predetermined format.

It will be appreciated that the embodiments are not limited to systems set up in the above described manner. The embodiments moreover extend to any of the above described controllers arranged to control the power router. According to another embodiment there is thus provided a controller arranged to be used in any of the above described systems, irrespective of whether the controller is provided as an independent unit that can be connected to a routing switch, physically combined with the routing switch or as part of a smart meter. According to another embodiment there is provided a smart meter comprising a controller arranged to be used in any of the above described systems. According to another embodiment there is provided a power router arranged to be used in any of the above described systems.

According to a further embodiment there is provided an apparatus arranged to control the routing of power on the consumer side of a smart meter in accordance with predetermined rules. The apparatus comprises an output for connection to and communicating with a power router, an input for receiving connection information of power sources and power consumers that are located on the consumer side of the smart meter and that are connected to the power router, a memory arranged to store the connection information, an identifying means for identifying an ongoing and/or future power consumption event by a said power consumer and a controller arranged to generate, based on said rules and in response to the identifying means identifying a power consumption event, control signals for transmission to the power router, wherein the control signals are for controlling the power router such that at least a part of the power consumed by the said power consumer during the power consumption event is routed to the said power consumer from at least one of the power sources located on the consumer side of the smart meter. The predetermined rules comprise at least one of a rule defining one or more power consumers and/or types of power consumption events for which power is to be provided from a said at least one power sources located on the consumer side of the smart meter and a ranking of different power consumers and/or types of power consumption events, the ranking determining an importance of modifying a load signature associated with the ranked consumer or event type. The apparatus can further be arranged to determine the amount of power that is to be routed to the said power consumer from at least one of the power sources and to generate the control signals so as to cause the power router to route the determined amount of power.

According to another embodiment there is provided a method of routing power within an end consumer of power supplied through a power grid. The method comprises identifying, based on information originating from within the system, an ongoing and/or future power consumption event by at least one power consumer of the end user. In response to identifying a power consumption event the method determines, based on stored rules and using a controller of a power router, a routing arrangement for routing at least part of the power consumed by the at least one power consumer during the power consumption event to the at least one power consumer from at least one further power source of the end consumer. The power router is then used to route power to the power consumer in accordance with the determined routing arrangement. The further power source is hereby connected to the end user, or forms part of the end user, in a manner that prevents metering of the power source by the smart meter.

According to another embodiment there is provided a method of anonymising application data. The method comprises receiving the application data from a smart appliances in a first format, anonymising the data to bring it into a second format accepted by a smart meter and sending the anonymised data to the smart meter.

According to another embodiment there is provided a method of privacy enhancement for a power consuming system in which use of power from a power grid is monitored by a smart meter. The method comprises providing power required by a power consuming event from a power source not monitored by the smart meter to alter the load signature of the power consuming event, as seen at the smart meter.

As discussed above, the power router, or the controller controlling the power router, may receive information from appliances. It is advantageous for the smart meter not to receive the same information, so that the only information received by the smart meter is modified/anonymised information provided by the controller/privacy enhancer. To facilitate this any direct data communication links between the smart meter and smart appliances may be disabled. According to another embodiment there is provided a method of setting up a privacy enhanced system of a power end consumer that comprises a smart meter. The method comprises setting a privacy enhancer up to allow it to enter into communicative contact with smart appliances and setting the smart meter up to not directly receive smart appliance data from the smart appliances. The method may further comprise preventing data communication to the smart meter while the privacy enhancer is set up.

According to another embodiment there is provided a method of shaping a load signature of a power consumption event in a power consumer metered using a smart meter by modifying a mix between metered power and unmetered power used for the power consumption event. Thus, while the overall power consumption of the power consumer may remain the same, the load signature seen by the smart meter is altered because of a change in the way locally available power is used.

Figure 3:
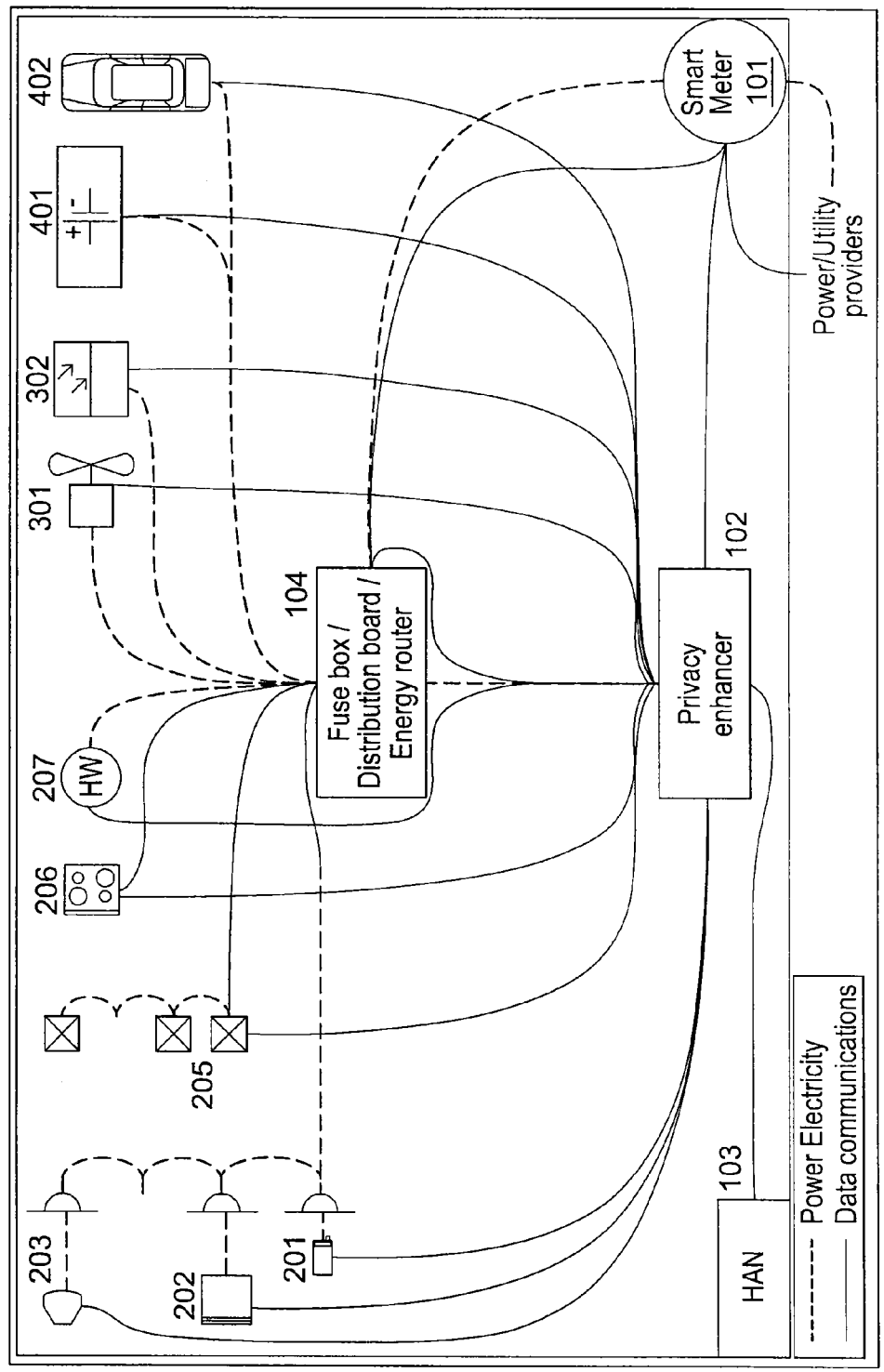
FIG. 3 shows a Home grid and communications architecture.

FIG. 3 shows an example of a home grid and home communications network according to an embodiment. The home grid comprises electrical lines over which electric power is transmitted (shown in dashed lines in FIG. 3). The home communication network is a network connecting devices for data communication (shown in dotted lines in FIG. 3). The home grid and home communications network comprises a smart meter 101. This smart meter may be owned by a utilities provider or by the home owner. The present invention is not limited by the nature or ownership of the smart meter 101. The smart meter may be any device that can generate a signature of the energy consumed in the property or properties for which it is employed and then transmit this signature to a third party, most likely the provider of the monitored utility (as shown by the dotted line connecting the smart meter 101 to the power provider in FIG. 3).

The home communications network also comprises a privacy enhancer 102, which is described in more detail below, a home area network, HAN, 103, which may be a general communications network set up on the home, an power router 140 as well as power consumers, generators and storage devices. Power consumers can be of any type and FIG. 3 a kettle 201, a washing machine 202, a TV 203, lighting 205 and a cooker 206 as examples. Energy storage devices may also be considered energy consumers when they store available energy. Examples of such energy storage devices include such devices that store the energy in a non-electrical form and that cannot convert the energy back into electricity. These devices include storage heaters and water heaters 207. The network shown in FIG. 3 also comprises energy storage devices that can store energy and release the stored energy in the form of electrical energy. The energy supply and storage devices shown are batteries 401 and an electric vehicle 402. The external power provider/grid can also be included in the category of energy storage and supply devices, as power generated in the home can be fed to the grid and later retrieved from it. Also shown in FIG. 3 are energy supply devices, including wind turbine 301 and solar panels 302. Such energy providers can of course include any form of microgeneration site that can be operated in the home, such as fuel cells.

Figure 2:
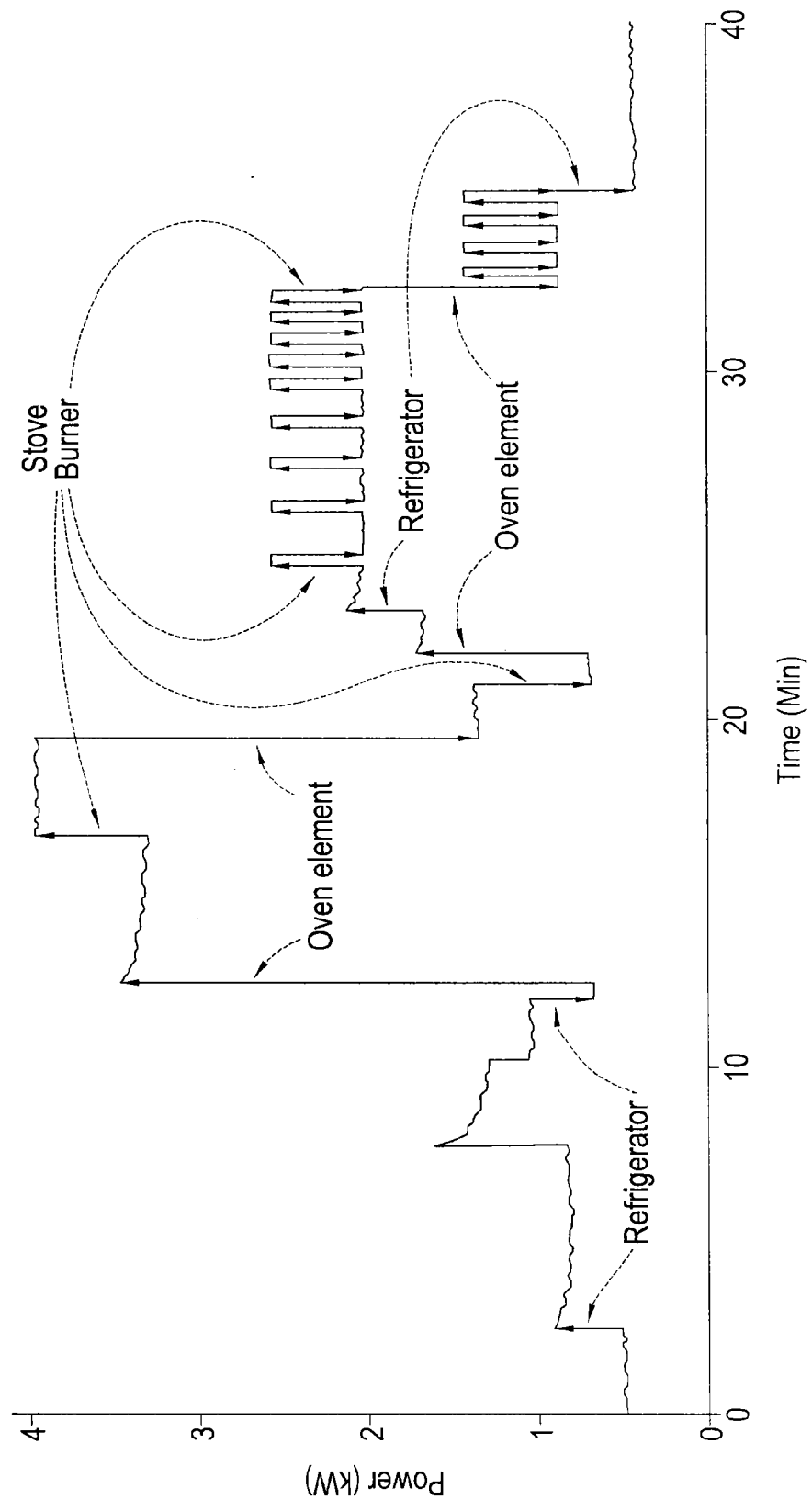
FIG. 2 shows step changes in a household's load signature due to individual appliance events.

Turning now to some of the components shown in FIG. 3 in more detail, the smart meter 101 is capable of performing frequent electricity measurements to determine the flow of power from the external power provider to the home and may generate a load signature for the household such as, for example, shown in FIGS. 1 and 2. The smart meter 101 can communicate the results of these measurements back to the power provider. The smart meter may further be arranged to receive communications from an external source (e.g. the utility or distribution network) demanding that control functions specified in the communication be fulfilled. Such control functions may, for example, seek to implement load control operations (such as load shedding) within the home.

The smart meter 101 may be able to control individual smart appliances, that is appliances that can receive control messages from the smart meter 101 and that can adjust their operation to meet the demands specified in any such control message. The smart meter 101 may also be able to receive individual metering or information data from the appliances (such as operation records and logs). The smart meter 101 in the preferred embodiment is, however, arranged to only control the privacy enhancer and does not communicate with individual smart appliances. Communication with the smart appliances is the responsibility of the privacy enhancer in the embodiment shown in FIG. 3, as described below.

The privacy enhancer 102 is responsible for designing, scheduling and shaping load signatures, according to user privacy requirements, as will be discussed in more detail below. In the embodiment of FIG. 3 the privacy enhancer also communicates with the smart appliances, taking over this responsibility from the Smart Meter 101. The privacy enhancer can also be arranged to forward moderated messages to the Smart meter. Finally, the privacy enhancer entity may optionally also be responsible for responding to external load control and shedding commands that arrive through the smart meter.

The Home Area Network 103 may take the form of a standard home communications network. In the embodiment shown in FIG. 3 the home area network 103 is further configured to provide an In-Home-Display (IHD), arranged to give the user access to the privacy enhancer 102 (via the dotted data communications link shown between the HNA 103 and the privacy enhancer 102) to allow the user, among other functionalities, to control and personalise the operation of the privacy enhancer 102. The In-Home-Display may provide a user interface for this purpose.

The Fuse box/Distribution Board/Power router 104 enables routing of electrical power between the power consumers, storage devices and sources it is connected to (as shown by dashed lines). This of course includes the mains grid to which the Power router 104 is connected through the smart meter 101. The power router 104 comprises a power circuit that is able to mix a number of different electrical power sources in order to supply a number of devices or appliances with a required amount of electrical power. The power router 104 interfaces with the privacy enhancer 102, which in turn is arranged to send control commands determining the manner in which the power router 104 routes the power to the relevant devices.

In the embodiment shown in FIG. 3, the appliances/power consumers/storage devices/sources, are connected to the privacy enhancer 102 through data communication links. These data communication links allow the communication of control commands from the privacy enhancer 102 to the connected devices or the communication of messages (such as messages providing status information relating to the device) from the device to the privacy enhancer 102. It will, however, be appreciated that it is not essential for these data communication links to be provided. It will, for example, be understood that some devices, such as batteries, solar panels and wind turbines, can be operated without the need for an exchange of information between the privacy enhancer 102 and the device. Instead power provided by the device can simply be routed to a desired device by the Power router 104. A battery that is to be charged can equally simply be connected to an appropriate power source by the power router 104. As mentioned above, however, the privacy enhancer 102 of the illustrated embodiment takes over the task of communicating with the appliances that may otherwise be the responsibility of the smart meter 101.

Although the privacy enhancer 102 is shown in FIG. 3 as an independent device that can be spatially separated from other devices, in particular form the Power router 104 and the smart meter 101, it will be appreciated that the privacy enhancer 102 may be provided in one piece of equipment together with the smart meter 101, with the power router 104, or with both. If the privacy enhancer 102 is provided in the form of an independent device (as shown in FIG. 3), then a means for measuring power consumption data is also required. This can, for example, take the form of an induction sensor clipped around the main electricity cable as fed into or out of the smart meter 101, or through interfacing with equivalent smart meter 101 functionalities. If the privacy enhancer 102 is provided in the form of an independent device, then it will also need to be able to communicate with the Power router (104) to control it, for example using the interface described in more detail below.

If the privacy enhancer 102 is within the power router 104 the power router 102 needs to have basic electricity measurement capabilities, much as a smart meter does, or alternatively interface with the smart meter (101) for the purpose of obtaining data on the amount of power consumed at a point in time. It is advantageous, however, for the privacy enhancer 102 to obtain power consumption data at frequent enough intervals so that the privacy enhancer 102 can react to a change in power consumption before this change shows up in the household's load signature.

In an alternative arrangement the privacy enhancer could be part of a 'better' smart meter 101 that consumers can choose at additional cost, and it will then by default have access to the live measurements conducted by the smart meter or to live measurement data obtained by the smart meter 101 through communicative links with smart appliances. A smart meter 101 including the privacy enhancer 102 is configured so that the smart meter 101 does not convey all of the load information obtained to third parties, such as the utilities provider. Instead this information is shared with the privacy enhancer 102 to allow the privacy enhancer 102 to fulfil its function. The smart meter 101 then only shares information relating to the actual power provided by the grid with third parties, so that the function of the privacy enhancer 102 remains hidden. In this case the privacy enhancer 102 will need to be able to communicate with the Power router (104) to control it, for example via the defined interface described in more detail below.

Figure 4:
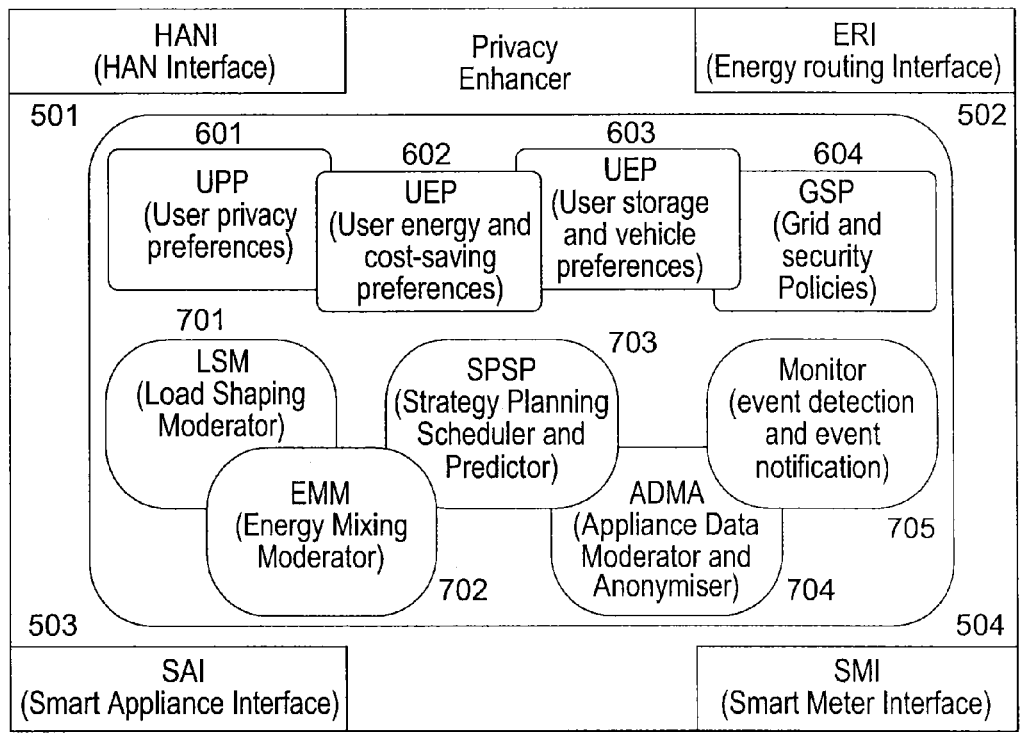
FIG. 4 shows a privacy enhancer structural architecture.

A schematic of the privacy enhancer's structural architecture can be seen in FIG. 4. The privacy enhancer shown in FIG. 4 comprises some interfacing components, such as a home area network interface, HANI, 501, an energy routing interface, ERI, 502, a smart appliance interface, SAI, 503 and a smart meter interface, SMI, 504. The home area network interface 501 enables the privacy enhancer to communicate with Home Area Network 103 devices, such as personal computers, mobile phones, and home gateways. The home area network interface can, for example, be used for control and management through Graphical User Interface software. The energy routing interface 502 enables the privacy enhancer to control the mechanism that moderates power routing and power mixing 104. The smart appliance interface 503 enables the privacy enhancer to communicate with smart home appliances. For example, smart appliance interface can be used to check the status of the electric vehicle energy resources 402 or to control the home heating system. The smart meter interface, SMI, 504 enables the privacy enhancer to communicate with the home smart meter.

The privacy enhancer shown in FIG. 4 also stores some rules and/or policies that define the constraints under which it operates. Such rules and policies may, for example, be stored in non-volatile storage within the privacy enhancer and be consulted by a controller of the privacy enhancer when a decision on power routing through power router 104 is contemplated or being made. The rules and preferences stored in the privacy enhancer shown in FIG. 4 include user privacy preferences, UPP, 601, user energy and cost-saving preferences, UEP, 602, user storage and vehicle preferences, USP, 603 and grid and security policies, GSP, 604. User privacy preferences 601 are a set of user preferences that control the required level of privacy. For example, user privacy references 601 are used to determine which load shaping strategy should apply for an individual one or a plurality or even each home appliance, device and/or storage unit. User energy and cost-saving preferences, UEP, 602, are a set of preferences that control the level of energy saving required by the user, for example as mandated by energy provider pricing. The user Energy and Cost-Saving Preferences can, for example be used to determine when is best to consume power from the external provider, when is best to "sell back" stored power to the grid, when it is best to use home generated energy to charge local energy storage devices. The user storage and vehicle preferences, USP, 603, are a set of preferences that control the required amounts of stored energy to be available at different times. For example User Storage and Vehicle Preferences can be used to determine the minimum amount of energy that should be stored in the electric vehicle to ensure that the vehicle is available, for example in case of emergencies or to cover impulsive needs to use the vehicle. The grid and security policies, GSP, 604 are a set of policies that determine how much information the privacy enhancer is allowed to moderate, under which circumstances the privacy enhancer will need to provide external parties with additional information, and other demands provided by the grid such as demand-side and load shedding management. For example, in case of grid overload or other emergency situation, the grid will need to control the demand-side by forcing a reduction to the total demand-side energy demand. In this case the smart meter will forward this command to the privacy enhancer through the GSP and a combination of automatic appliance demand moderation, or automatic appliance suspension of operation, as well as power routing arrangements may be enforced to meet the total power limitation grid requirement.

The privacy enhancer shown in FIG. 4 moreover comprises a number of mechanisms for implementing the preferences policies and constraints defined in components 601 to 604. These mechanisms include a load shaping moderator, LSM, 701, Energy mixing moderator, EMM, 702, a strategy planning scheduler and predictor, SPSP, 703, an appliance data moderator and anonymiser, ADMA, 704 and a monitoring component 705. The load shaping moderator 701 is used to formulate load shapes that will result in load signatures that will satisfy all user requirements (for example as defined in the user privacy references. The energy mixing moderator 702 is used to determine a suitable set of mixing/routing parameters that can generate a desired load shape in order to get a desired target home load signature. The strategy planning scheduler and predictor 703 is used to determine a set of target load shapes that will be suitable in the future. For example strategy planning scheduler and predictor can be used to determine that the privacy of a current event can be compromised in favour of an imminent event for which the user requires guaranteed privacy. Such imminent events can be scheduled by the strategy planning scheduler and predictor, for example based on event schedules sent by smart appliances. A coffee machine or a bread maker may, for example, have notified the privacy enhancer that they are programmed to commence operation at a certain time of the day, for example early in the morning. If a particular device, say an automatic vacuum cleaner, is scheduled to operate as certain time, and it is an important user requirement that the operation of the device remains secret, then the strategy planning scheduler and predictor may compromise the privacy of preceding events/device operations in favour of the privacy of the device in question, a vacuum cleaner in this example, if it is deemed that there are not enough resources to meet all user requirements. The appliance data moderator and anonymiser, ADMA, 704, is used to moderate received data from smart appliances in accordance with privacy requirements and load shaping moderation. The monitoring component 705 is used to detect potential privacy threats (physical threat detection) by monitoring home and appliance usage. Usage is monitored using two mechanisms. The first mechanism is an electrical mechanism that is used for monitoring load signatures through either smart meter interface or a separate power measurement mechanism, as discussed above. The second mechanism is a communication mechanism that monitors metering or smart appliance data. Such metering can be achieved through direct data communication between the smart appliances and the power router and/or through the home area network interface 501.

It will be appreciated that the privacy enhancer shown in FIG. 4 is one example of a possible privacy enhancers and that the privacy enhancer can take other forms. Alternative possible privacy enhancers, for example, may not comprise all of the components shown in FIG. 4, yet fulfil the purpose of modifying a household's energy load shape in a satisfactory fashion.

Examples of Load Shaping Moderation Strategies

In the following a number of different load shaping moderation strategies are discussed by way of example only. These and other load shaping strategies can be employed/implemented by the privacy enhancer depending on the desired level of privacy and other requirements or constraints. A desired level of privacy may, for example, not be achievable at all times, in particular when energy consumption considerably and/or over a longer period of time outstrips the household's ability to generate energy or to retrieve stored energy. It is moreover possible that it may not be possible for the privacy enhancer to provide a desired level of privacy if the smart meter 101 is under instruction from a utility provider to perform certain tasks, such as load shedding (for example by charging batteries) and the like. Such operations are, in one arrangement, classed by the privacy enhancer as overriding a user's privacy preferences UPP 601. In this case the actual consumption behaviour of the user is, however, masked by the utility provider's demands, so that the amount of information available from an analysis of the household load profile is reduced in any case.

Figure 5:
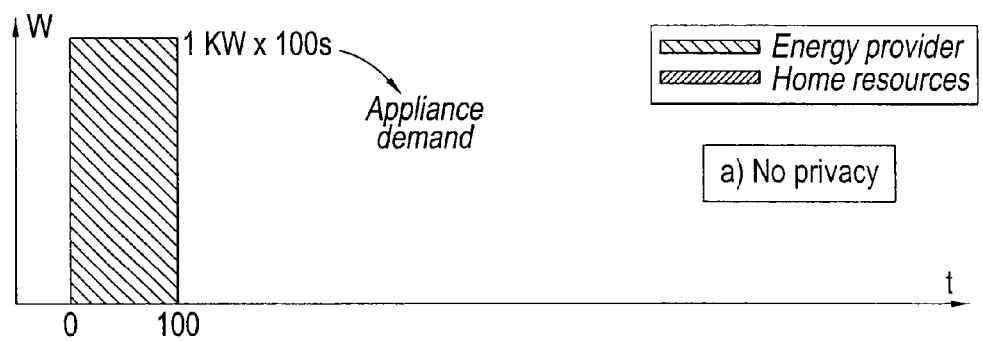
FIG. 5 shows a power consumption example without load shaping.

FIG. 5 shows the contribution a device makes to the household's load profile without the use of load shaping moderation. The device signature shown in FIG. 5 relates to the consumption of 1 kW of power over 100 s. This contribution will simply be added to already existing parts of the household's load profile and, if the smart meter 101 uses a sampling interval that is sufficiently fine, will appear in the household's load profile in the manner shown in FIG. 5. It will be appreciated that from the appearance of this device signature in the household's load profile conclusions may be drawn as to the nature of the device, as discussed in the background section above. This constitutes a potential security threat that may be contrary to the home owner's requirements.

Figure 6:
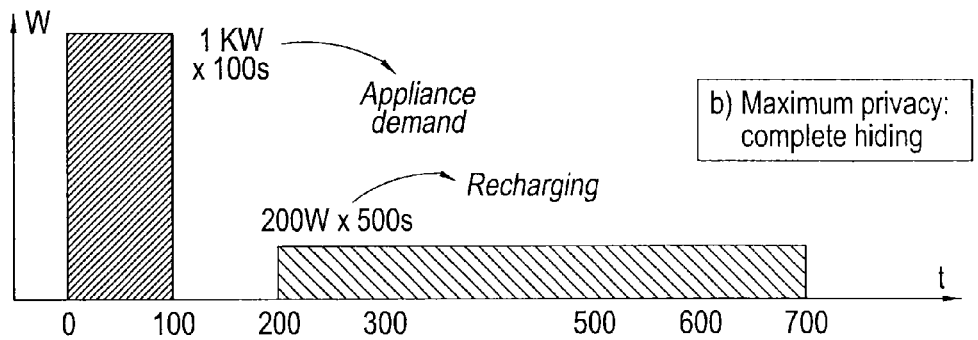
FIG. 6 shows a first load shaping scenario.

FIG. 6 shows a simple scenario in which the privacy enhancer 102 instructs the power router 104 to meet the energy requirements shown in FIG. 5 by using energy stored in a local storage device, such as batteries 402 or vehicle 402 shown in FIG. 3, or energy generated locally. In this case the load signature of the household will not show any trace of the activation of the device, as the consumed energy is provided internally within the household in a manner that is not detected by the smart meter 101. The energy storage devices will of course need to be recharged. If the household does not comprise microgeneration capabilities, then the energy required for the re-charging will need to be obtained from the grid. The re-charging operation can, however, be performed in a manner that prevents identifying the nature of the device that has originally consumed the energy. In FIG. 6, for example, the amplitude of the energy pulse used for charging is only one fifth of the amplitude of the energy pulse originally consumed by the device. The charging pulse, however, extends over five times the duration of the energy consumption of the originally consuming device and commences only some time (in this example 100 s) after the actual energy consuming event has been completed. In this way the household's load signature is smoothed (if the smart meter samples energy consumption sufficiently frequently) and the time point of use of a consumer in question is hidden.

It will be appreciated that, should the smart meter have a metering reporting interval that is longer than the 700 s required for the entire routine shown in FIG. 6, then the energy moderation routine shown in FIG. 6 will not change the household's load signature. The gap between the discharging of an energy storage device and the re-charging shown in FIG. 6 (100 s in the FIG. 6 example) may, however, be adjusted so that it takes into account the metering reporting frequency of the smart meter. If the gap is, for example increased so that the entire Figure operation takes a period of time that is comparable or even longer than a single metering reporting interval of the smart meter, then the likelihood of blurring the device's signature in the household signature in a manner that renders it less easily detectable is increased.

Satisfying an energy demand using stored energy has the further advantage that microgeneration can play an enhanced role. A microgenerator that provides an output that could, on its own at least and if directly linked to a consumer in question, not satisfy the energy requirements of the consumer in question, can, nevertheless (fully) satisfy these energy requirements by fully replacing the amount of energy drained by the consumer from the battery, if possible in light of later power demand of other consumers. It will be appreciated that, if a battery does (contrary to what is shown in FIG. 6) not rely on grid power for its re-charging, then the energy consumed will not show in the load signature at all. Equally, it the re-charging of the storage device relies partially on grid power and partially on locally generated power, then the signature of the energy consuming event is modified considerably, as only the part of the energy obtained from the grid will be evident in the household's load signature.

Figure 7:
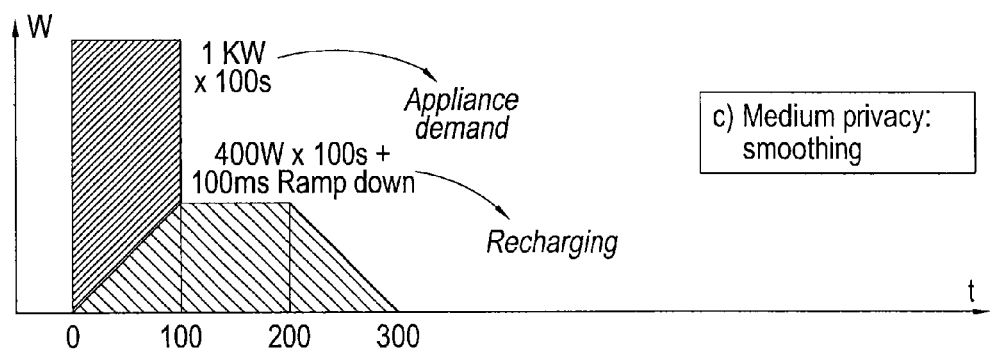
FIG. 7 shows a second load shaping scenario.

FIG. 7 shows another example of how the privacy enhancer 102 could instruct the power router 104 to modify the mix of locally provided/stored/generated energy and grid energy to satisfy a given demand. This example is particularly useful where local energy source do not have sufficient capacity for providing all of the energy required by the energy consumer.

As can be seen from FIG. 7, the appliance demand is covered by a mix of home energy and external energy. Initially consumed energy is completely provided from local sources. In the FIG. 7 example the amount of locally provided energy, however, linearly decreases and is supplemented by an equally linearly increasing amount of grid power until about 40% of the consumed energy is provided from the grid. The contribution the appliance makes to the household's load profile in this case is the trapezoidal area shown in FIG. 7. It shape is still much smoother that what it would be without home energy mixing, and the overall home load signature will be correspondingly smoother. It will be appreciated that even such relatively simple mixing of energy source can change the household's load signature in a way that prevents the use of certain analysis techniques. An edge detection technique that would normally be suitable for identifying the consuming device used in the FIG. 7 arrangement will, for example, be less likely to correctly identify the consuming device.

Although the FIG. 7 example relates to a linearly changing mix of energy sources, the amount of energy provided over time by a number of energy source (including the grid), can vary non-linearly. The variation may, for example be chosen so that the contribution the consumer makes to the household's load profile is not one that can be recognised as being related to the particular consuming device, at least when currently known analysis techniques are used. Shaping of the load profiles in this manner can go as far as shaping the load profile of an appliance (as seen by the smart meter 101) so that it appears like a load profile of some other, different appliance.

Providing 100% of the energy from local sources is possible if the privacy enhancer is aware that the device will consume the energy at a given point in time, so that the appropriate routing function can be implemented at the time the consumption has commenced. This may be possible if the energy consuming event has been scheduled, for example in the manner discussed above. Alternatively the power router 104 may be configured to respond to a demand for energy by providing an initial part of this energy from local sources, irrespective of the nature of the demand. Should it later be determined that it is desirable to supply part of the demanded energy from the grid (as is the case in the FIG. 7 example), then this can be quickly and easily implemented by switching to grid supply, be that in a gradual fashion (as shown in FIG. 7) or in a more abrupt fashion, if privacy concerns do not apply or have been overruled.

It will moreover be appreciated that, should the smart meter have a metering reporting interval that is long when compared to the energy consuming event, that the power router 104 can be set up to allow an initial supply of the demanded energy from the grid. This initial energy supply can then be detected, for example using the above mentioned inductive clip provided around a cable supplying energy from the grid, and used as a triggering event for activating the privacy enhancer and, for example, implementing load shaping. Because of the long metering reporting interval of the smart meter 101 the initial consumption of grid energy may go substantially unnoticed, at least to the degree that it may become unrecognisable in the household's load profile as initial energy consumption by a particular energy consumer.

Figure 8:
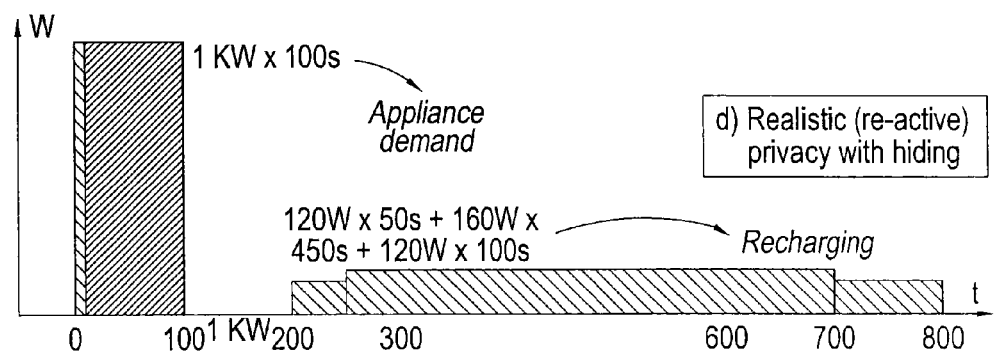
FIG. 8 shows a third load shaping scenario.

FIG. 8 illustrates an example where the privacy enhancer 102 causes the power router 104 to switch supply of power for a particular device (consuming in this example again the 1 kW for 100 s), so that the energy required by the device is provided by sources within the household (energy storage devices, generators etc) after the device has been supplied with power from the grid for an initial period of 10 s. This scenario is particularly applicable to situations where future energy requirements are not know to the privacy enhancer, that is where future activities of power consumers are not scheduled or not always scheduled. In this case the privacy enhancer can react to information indicating the sudden increase of power consumption by 1 kW. As discussed above this indication may be obtained from the smart meter 101 or from a sensor associated with the privacy enhancer 102, such as the inductive clip sensor mentioned above.

During its 100 seconds of operation the appliance will only consume 10 seconds power from the energy provider (~2.8 Wh), which will may be little enough to maintain the privacy for this operation. Recharging of any storage devices that have been discharged while the device has consumed energy can again commence after the energy consumption even has ceased. FIG. 8 illustrates that re-charging does not have to be performed by imposing a constant power drain on the grid. It will be appreciated that the smoothing example above (FIG. 7) could also be operated reactively, so that an initial energy supply comes from the grid.

Figure 9:
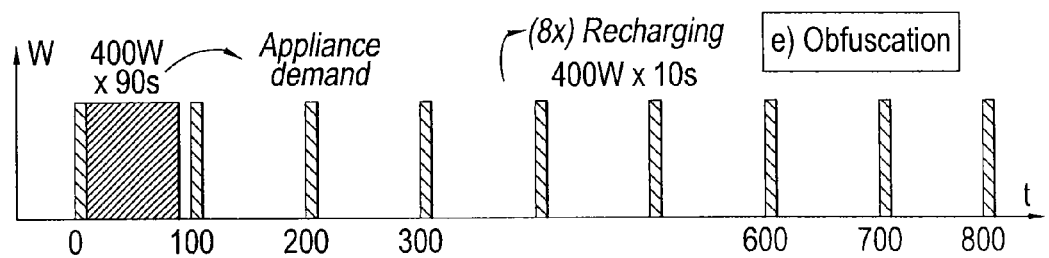
FIG. 9 shows a fourth load shaping scenario.

FIG. 9 shows another privacy enhancement strategy. As was the case in the FIG. 8 example, the FIG. 9 example is reactive in that it allows an initial (10 s) demand for energy to be met by energy from the grid and in that the remaining energy requirements of an energy consumer are met by local energy sources, in the FIG. 9 example by energy storage devices (although in yet another example energy generators could also be used to meet at least part of the energy requirements).

Instead of recharging the energy storage devices with a constant load, as was the case in FIG. 8, the FIG. 9 example employs a "comb" shaped or intermittent re-charging load shape pattern instead. This can result in a spikier household load signature (depending on the metering reporting cycle of the load signature creation and the existence of other loads), so that the household load signature is obfuscated. Moreover, even if the information available from the household's load signature allows detecting a load of 400 W activated over only 10 seconds, it will at least is will not be possible to tell in which of the reoccurrences of this 10 s event the energy consumer has been turned on. It will be appreciated that other, potentially more complicated privacy enhancement strategies and patterns can be employed in order to increase privacy, for example by applying smoothing, obfuscating, randomly scrambling, or hiding load shapes or combinations of these and the above discussed strategies.

It should also be mentioned that the load shapes created by the privacy enhancer 102 can incorporate multiple energy supplies, such as home energy generation resources. If for example, there is a wind turbine, then its produced electricity can be used to supply home electrical appliances. If this supply exceeds the demand, the energy surplus may be either stored in the home or sold back to the grid. If, however, the locally generated energy cannot meet all home demand, then it can be topped up with energy from home storage devices and/or external/grid energy. Thus, if local energy generators such as wind turbines and photovoltaic panels are available less stored energy usage (and recharging) may be required.

It will be appreciated that there is a large likelihood that a privacy enhancer will at least partially have to operate in a reactive mode in which the privacy enhancement function is activated/triggered by a sudden/new increase in energy consumption. In the more realistic (reactive) case, the operation of the privacy enhancer can be triggered by real-time observation of the overall mains electricity consumption. It is preferable for the privacy enhancer 102 to operate at a much finer scales than a smart meter would use for reporting (i.e. seconds rather than minutes), so that when it detects new activity in the home, irrespective of the device or appliance which is causing this activity, the privacy enhancer can activate and start its moderation function.

Home appliances that can be activated remotely or even wirelessly are known. Some such home appliances are also capable to provide a report of their status to a central unit. Such home appliances may further be arranged to be in communicative contact with the privacy enhancer 102, as shown in FIG. 3, so that they can notify the privacy enhancer 102 of an impending activation, be that immediately before their activation with enough time for the privacy enhancer 102 to activate a desired privacy protocol or in good time before activation, as may be possible if an activation event is scheduled, for example a pre-programmed activation of a coffee machine or a bread maker in the morning, or the scheduled activation of a washing machine. Energy moderation strategies could be adapted to already known energy consumption characteristics of the home appliance.

It will be appreciated that the level of privacy enhancement that may be provided by the privacy enhancer is dependent on the amount of energy that is being consumed an on the amount of energy available from sources other than the grid. For example, while it may be moderately easy to provide the energy required by a kettle from local sources (and therefore hide its activation, for example in one of the ways discussed above with reference to the figures), it may be more difficult to hide the activity of a more power hungry appliance, such as a washing machine, unless a sufficient amount of energy can be supplied from local sources, for example by a combination of electric cars plugged into the house, and solar panels on a very sunny day etc.

Any locally available energy, be that stored energy or locally generated energy, may be needed for other, more preferable purposes, such as sell back to the grid, or storage for later use, e.g. for a potentially long drive in the case of a car battery. The degree of privacy-driven moderation by the privacy enhancer 102 will thus depend on other attributes, such as price-driven moderation, and storage-driven requirements. These attributes may be stored within the privacy enhancer 102, for example in the user privacy preferences 601, in the user energy and cost-saving preferences 602, in the use storage and vehicle preferences and in the grid and security preferences 604.

Moreover, different levels of privacy-driven moderation may be required in various instances. For example, the user may wish to completely hide the use of some power consumers operating at certain time, say for example lights and kettles that may operate between 11 pm and 9 am, partially cover (e.g. smooth) the use of other power consumers, say for example a vacuum cleaner, and choose not to moderate the consumption of power hungry devices, such as a washing machine, not least because the prolonged power usage of such devices may allow the above discussed Non-Intrusive Appliance Load Monitors-like protocols to still recognise its profile usage in most cases unless 'very expensive' smoothing is enforced. The privacy enhancer can thus apply a different routing strategy for different types of appliance (assuming that the privacy enhancer can recognise different types of appliances, which may be achieved through the above discussed communication of the privacy enhancer with smart appliances).

The above discussed operational preferences, if defined, will influence the power routing management operations of the privacy enhancer 102. It is also anticipated that these operational preferences may a) be set by the user, b) be modified by the user at different times, and c) be applied in real-time. For example, the user may specify that certain devices should be completely hidden at all cost, whereas other may not.

It is moreover envisaged that the privacy enhancer 102 can be used to emulate the operation of an electrical device of appliance. For example, the privacy enhancer could emulate the operation of a kettle by allowing a fast charging battery to consume electricity from the grid, or it could emulate light electricity usage within the home (TV, lighting, etc) when the users are on holidays by charging up accordingly (slowly) empty energy capacitors. For example, the kettle operation can be sufficiently emulated with the use of a Toshiba Super Charge Ion Battery (SCIB—see, for example, at http://en.wikipedia.org/wiki/SCIB). Assuming that a kettle requires 2 KW for 2 minutes, a 24V battery can emulate the kettle by charging itself up $$\frac{2 \text{ KW} \frac{2}{60} \text{ hours}}{24 \text{ V}} = 2.78 \text{ Ah}$$

in 2 minutes. Assuming that a 24V SCIB battery pack can charge up 4 Ah in 30 minutes (numbers taken from http://www.scib.jp/en/product/spec.htm), and one pack will only charge up $$\frac{4}{15} \text{ Ah}$$

in 2 minutes, we the kettle can be emulated with the use of (2.78×15/4)=11 such battery packs. This emulation can be further supported by the privacy enhancer 102 sending profiling and metering details to the smart meter, regarding the operation of the (virtual) kettle.

In a different embodiment the privacy enhancer is arranged to supply all electricity demand from private home energy sources, before starting mixing in power from energy provider, in order to provide extra protection. Also the privacy enhancer would be programmed (or could predict) at which times to switch from primarily using the private home energy sources to primarily using the energy provider supply, for example based on a time dependence of grid energy cost, for example as defined in the user energy and cost-saving preferences 602 discussed above with reference to FIG. 4, before starting to mix local energy sources with grid energy.

The privacy enhancer 102 may further be arranged to take predictions of home energy production, such as energy created by renewable sources such as wind turbines and solar panels based, for example on weather forecasts or, more short term, based on the day's performance and the time of day, into account. The privacy enhancer may, for example, permit an increased discharge rate of local storage devices if it is known that local energy generators will in the near future generate an amount of energy that can facilitate sufficiently rapid re-charging of the discharged storage devices.

The privacy enhancer 102 may additionally be arranged to alter the scheduling of the activation of smart home appliances to take a predicted future availability of locally generated energy into account. For example, if the home is supplied by a wind-powered generator, the operation of the washing machine can be scheduled to coincide with a period in which sufficient, or at least a large amount of wind energy is available, so that the operation of the washing machine no longer noticeably or even detectably features in the household's load signature.

Moderating Metering Data Received from Smart Appliances

Smart appliances may communicate various metering data (e.g. schedules, operations, past logs) to smart meters. With the addition of the privacy enhancer (or, equivalently, with the privacy-enhanced smart meter) these communication links can be reconfigured to exist only between the smart appliances and the privacy enhancer 102. The following two-stage procedure can, for example, be used to ensure that smart appliances communicate with the privacy enhancer 102 instead of with the smart meter 101.

In a first step the smart meter is isolated and the privacy enhancer 102 and the smart appliances are prepared/set up for initialisation of secure communications with the privacy enhancer 102. The smart appliances are then configured to communicate with the privacy enhancer 102, for example in the same manner or in a similar manner in which they could be configured to communicate with the Smart Meter 101. Such communication may be achieved using the smart appliances standard smart metering communications interface. Smart appliances that have the capability to communicate rich appliance information and controls to the privacy enhancer 102 are particularly advantageous. It is particularly advantageous for the Smart Meter 101 to be set up so that it does not interfere, or even listen, to the smart appliance and privacy enhancer 102 communication setup messages In a second step the privacy enhancer 102 and the Smart Meter 101 are prepared to initialise their common interface. In the simplest case the smart meter 101 may treat the privacy enhancer 102 as if it were a standard smart appliance. More advanced functionality and interoperability may, however, provide additional advantages.

Once the privacy enhancer 102 is set up, the privacy enhancer can receive messages from both smart appliances/devices and the smart meter 101 and, based on these messages, moderate energy usage and energy routing, as appropriate. Alternatively or additionally the privacy enhancer 102 may send moderated smart metering data back to the smart meter 101. The privacy enhancer 102 presents this smart metering data to the smart meter 101 in the format required by the smart meter 101 for generating profile data supporting and being compliant with the household load signature. The moderated additional metering data may thus summarise home energy usage operations in the manner requested by energy providers, and as moderated by the Privacy enhancer in accordance with the user privacy preferences and other privacy policies.

To further increase privacy, the privacy enhancer may also be configured to hide the digital identities (such as manufacturer and model number ID details) of some or all of the smart devices it is connected to (for those smart appliances that include information of this nature into their communication messages)

The privacy enhancer 102 may also be configured to override user privacy requirements under certain circumstances. Under these circumstances the privacy enhancer 102 will then provide the smart meter with private user energy information. Circumstances in which such overrides are required include situations in which external policies have the right to bypass user privacy protection policies (e.g. national security policies, police forensic requirements or extreme smart grid survivability policies). In such cases it is envisaged that users will be informed accordingly.

Figure 11:
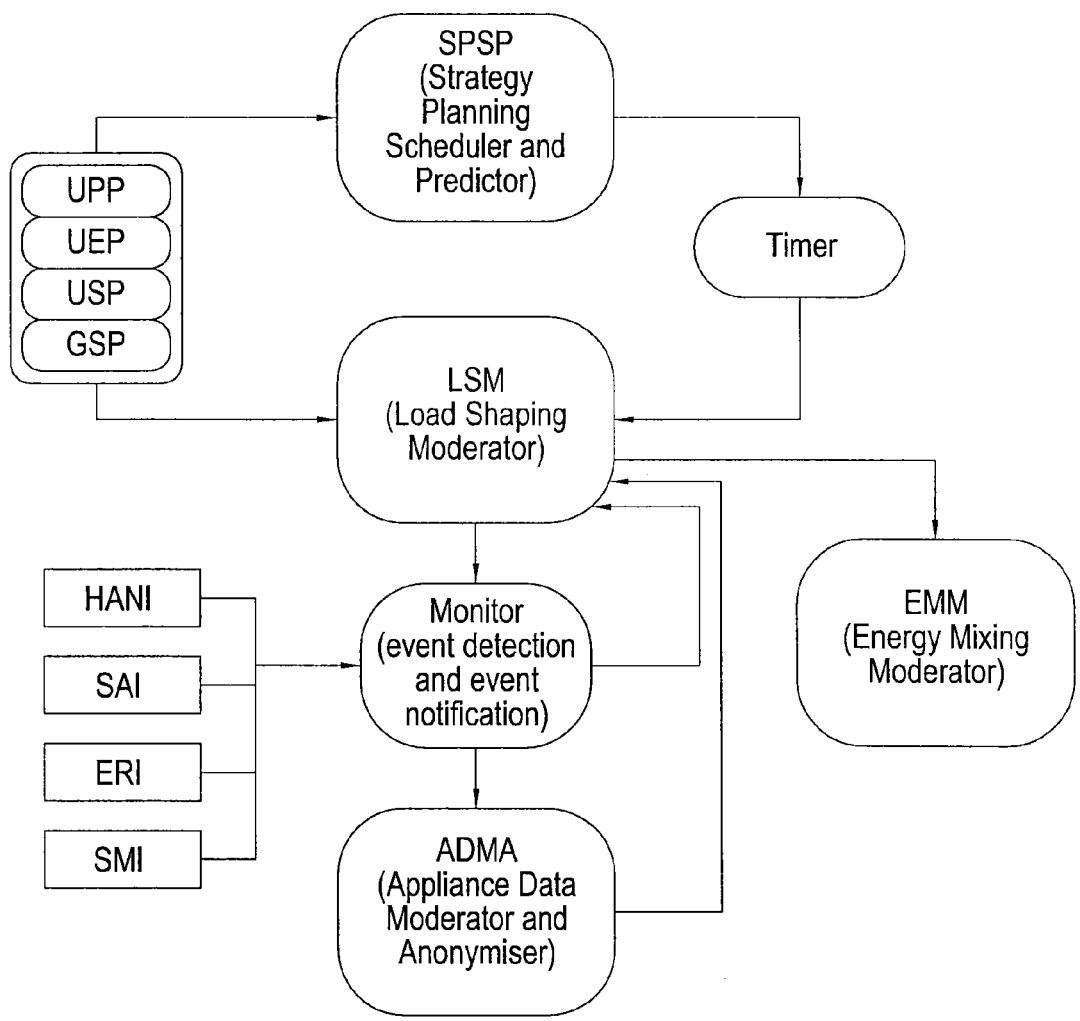
FIG. 11 illustrates and operational model of a privacy enhancer.

Discussing now the operation of the privacy enhancer 102 in more detail FIG. 11 depicts an operational model of the privacy enhancer, including some basic operational relationships among privacy enhancer 102 entities. The central entities of the privacy enhancer 102 are the load shaping moderator LSM and a monitoring entity, which waits for triggers that may require action and which, upon the identification of an appropriate trigger, activates the load shaping moderator LSM. The load shaping moderator is responsible for shaping target load signatures according to a set of requirements which may include the user privacy preferences, user energy and cost-saving preferences, user storage (and vehicle preferences and the grid and security policies discussed above with reference to FIG. 4.

The load shaping moderator LSM is also triggered by strategy planning scheduler and predictor, which is responsible for creating future plans for required load signatures. The monitoring entity is arranged to monitor a variety to inputs, including a power measurement mechanism, which can be provided by the smart meter or by a separate sensor such as the above discussed induction clip, and other data interfaces, including the home area network interface HANI, the smart appliance interface SAI, the energy routing interface ERI and the smart meter interface SMI discussed above with reference to FIG. 4.

Once the monitor has detected a change in the energy consumption in the household and the load shaping moderator LSM has formulated strategy that is suitable for moderating the energy consumption in a way that hides the energy consumption in conformity with the preferences and securities defined by the user (for example the user privacy preferences UPP, user energy and cost-saving preferences UEP, user storage and vehicle preferences USP and the grid and security policies GSP discussed above with reference to FIG. 4), the power router 104/energy mixing moderator EMM is called to enforce the load shape by controlling the energy routing mechanism.

In one embodiment the monitor is arranged to listen to smart appliance data such as individual metering data and control or scheduling data that may be received through the home area network interface HANI. If such data is received/used, the appliance data moderator and anonymiser is called to apply any required data moderation and update other operations, such the scheduler for future events. The home area network interface HANI will also be used to obtain other information critical for the operation of load shaping moderator LSM, such as the status of energy sources—i.e. battery charge levels, solar panel output, wind power output, weather forecasts, etc.

Figure 12:
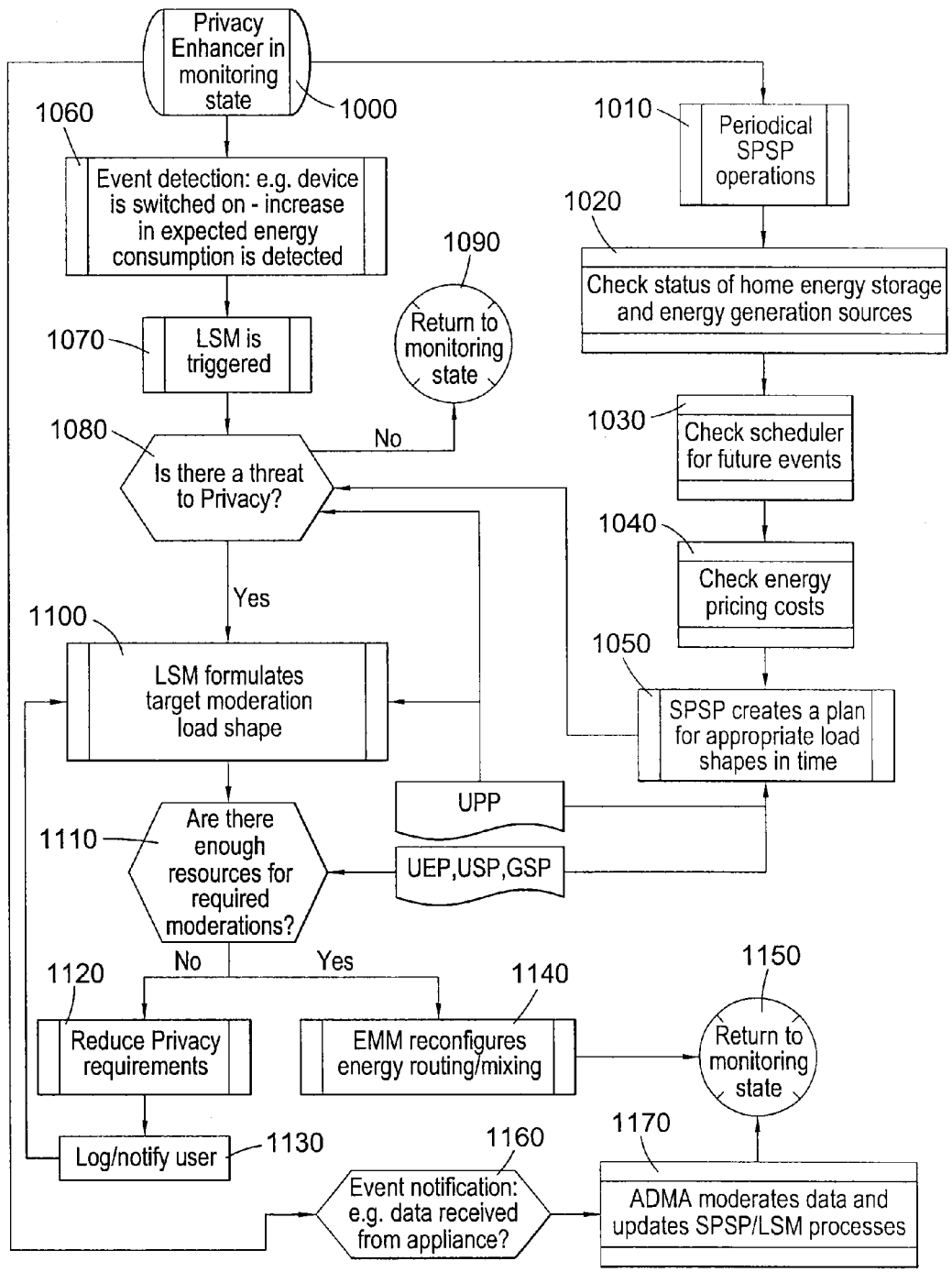
FIG. 12 shows an operational flowchart of a privacy enhancer.

FIG. 12 shows an example flowchart of the operations that may take place in order to apply energy and data moderation. At the start of the process 1000 the privacy enhancer 102 is in a monitoring state, while the strategy planning scheduler and predictor SPSP goes through a circle of standard operations 1010. These standard operations include checking 1020 the current status of home energy storage and energy generation resources, for example through home area network interface HANI, checking 1030 the strategy planning scheduler and predictor's SPSP scheduler for future events and checking 1040 energy pricing costs plan, for example as supplied by the energy/utilities provider. Checking 1030 the strategy planning scheduler and predictors' SPSP scheduler can include checking a home central heating schedule, a home cooking predicted schedule, a washing machine timed schedule, a hot water predicted schedule, an electric vehicle driving schedule, a weather forecast and an energy production predictions, etc.

The strategy planning scheduler and predictor then formulates 1050 a plan for appropriate home load signatures based on the above discussed user privacy preferences UPP, the user energy and cost-saving preferences UEP, the user storage and vehicle preferences USP and the grid and security policies GSP. For example the strategy planning scheduler and predictor will:
  create a load shape plan that makes sure that there are enough stored energy resources for scheduled and/or predicted events,
  create a load shape plan that makes sure that there are enough stored energy resources for energy-saving purposes,
  create a load shape according to demand-side response and load shedding requirements/suggestions, and/or
  create a load shape plan that will make sure the privacy requirements, all above load shaping restrictions, and requirements for random (unplanned) energy demands, are met.

With regard to fulfilling the privacy requirements even for unplanned energy demands, a user of the privacy enhancer 102 may wish to hide peaks when unexpected events occur to the degree possible. The user may, for example prefer to conceal the fact and the time of his tea brewing habits, regardless whether energy from the provider is currently offered at a very cheap price.

Returning to FIG. 12, an unplanned power consumption event will manifest itself in the form of a (sudden) increase in the amount of power consumed, as may, for example be caused by the activation of a kettle. In this example the monitor will detect a spike (or increase) in external energy consumption in step 1060, for example using the above referred to electrical metering methods and will notify the load shaping moderator LSM in step 1070 to enable the load shaping moderator LSM to take action. The load shaping moderator LSM will in turn (and once activated by the activation signal received from the monitor) access the strategy planning scheduler and predictor plan SPSP and the user privacy preferences UPP to determine, in step 1080, whether or not there is a threat to privacy. Should it be determined that there is no threat to privacy, then the privacy enhancer returns to a monitoring state in step 1090.

If the load shaping moderator LSM determines that there is a threat to privacy, the load shaping moderato LSM formulates a target moderation load shape in step 1100, based on input from the user privacy preferences UPP (for example the obfuscation load shape shown in FIG. 9). In step 1110 the privacy enhancer determines, user energy and cost-saving preferences UEP, user storage and vehicle preferences USP and grid and security policies GSP, whether or not there are enough resources to apply a moderation scheme that has been determined as being appropriate. If the moderation is too demanding, LSM will reformulate a target moderation load shape by reducing the privacy requirements in step 1120. This may be done by using a medium privacy smoothing strategy, as seen in FIG. 7). The user is optionally notified of this change in the protection of his privacy in step 1130 and a new target moderation load shape is then formulated in step 1110 in accordance with the reduced privacy requirements.

If it is determined in step 1110 that sufficient resources are available for implementing the target moderation load shape, then the energy mixing moderator EMM enforces the target moderation load shape in step 1140 by controlling the energy routing and energy mixing mechanism accordingly through the energy routing interface ERI before returning to a monitoring state in step 1150 once the target moderation load shape has been enforced.

If there are any data received from smart appliances (a washing machine schedule may, for example, be received through the home area network interface HANI) an event notification is provided by the monitoring device to the appliance data moderator and anonymiser in step 1160. The appliance data moderator and anonymiser assess the received notification and it will act accordingly in step 1170. For example, the appliance data moderator and anonymiser may update the scheduler accord to the notification and may moderate and anonymise metering data that is to be supplied to the smart meter 101 according to the load moderation load shape in use, before forwarding it to the smart meter 101.

The strategy planning scheduler and predictor SPSP, the load shaping moderator LSM, the energy mixing moderator EMM, and appliance data moderator and anonymiser may moreover operate concurrently. For example, while strategy planning scheduler and predictor SPSP is formulating load shaping plans, the load shaping moderator LSM may be formulating a moderation load shape to be applied instantly. Also, while the energy mixing moderator EMM is controlling energy routing and/or mixing for a given moderation load shape (which load shaping process may last a considerable amount of time, for example 800 seconds, as can be seen in FIGS. 6 to 9), the monitoring mechanism or the scheduler may trigger the load shaping moderator LSM to re-moderate the home load signature.

Figure 10:
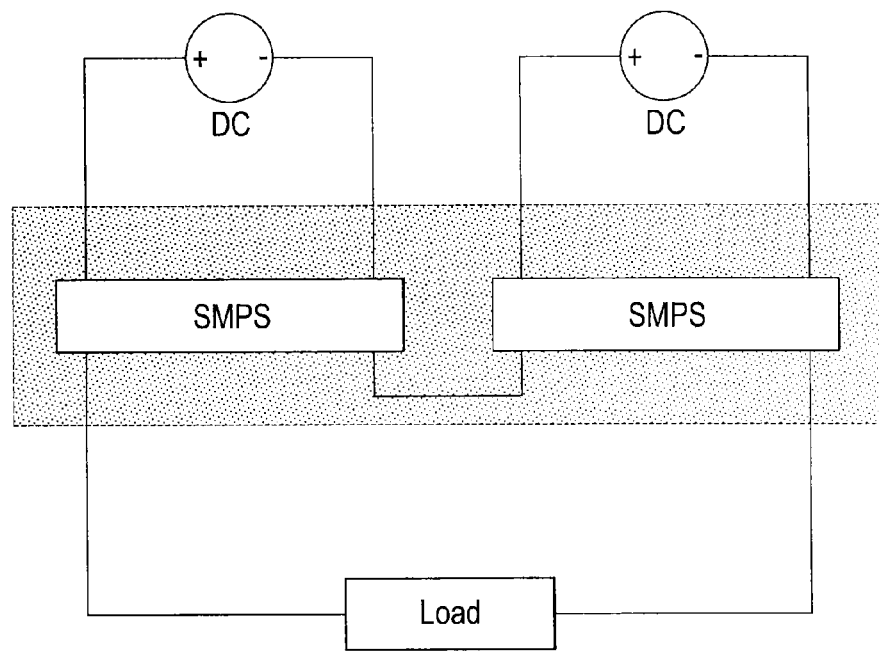
FIG. 10 shows a power mixing arrangement.

Turning now briefly to an example of an power router, FIG. 10 shows a switched mode power supplies, SMPS. The two voltage sources shown in FIG. 10 are two equal 10V DC sources. The load supplied by these two voltage sources is a 10 W/10V load. The energy percentages provided to the load by each switched mode power supply SMPS can be controlled, for example by regulating the output voltage of each switched mode power supply. The two switched mode power Supplies can, for example, be configured to provide voltages of 8V and 2V respectively, to provide the required 10V supply voltage. The person skilled in the art would of course be able to design more complex energy mixers for a variety of AC/DC sources and loads.

It will be appreciated that the provision of the strategy planning scheduler and predictor SPSP the flexibility of the load shaping modulator LSP is tremendously increased. The SPSP, for example, allows creating a centralised schedule of energy consuming events/activities (as opposed to a local schedule of activity as may exist in a smart appliance). The scheduled energy consuming activities may not only be scheduled in a manner that enhances privacy protection but also in a manner that may minimise the overall use of grid supplied energy. The scheduling may, for example, be modified not only to take privacy protection considerations into account by may, within limits, also be altered to take the availability of locally generated energy into account. A schedule of outstanding energy consuming activities may, for example, be modified to account for a predicted increase or decrease in available solar or wind energy etc. The activation of an automatic vacuum cleaner may, for example, be delayed if it is predicted, for example based on a weather forecast, that sufficient solar or wind energy will be available at a time somewhat later than an originally scheduled time. In this case the vacuum cleaner's energy demands may be fully met by the output of the local microgenerator, therefore fully protecting the users privacy by preventing the vacuum cleaner's energy consumption form entering the household's load signature.

User privacy requirements can in some cases conflict with user energy-saving requirements. For example, the user may wish to turn various appliances on/off at certain times. The user may, for example, wish to active a TV and/or lights during the night, and the user may wish no metering data to be recorded for these activities. In this case the privacy enhancer can moderate the load signature so that its shape corresponds to the typical night load signature, e.g. the aggregation of the fridge and heating load signatures. In order to hide the appearance of the additional energy demand, the privacy enhancer may be mixing in additional energy from a home storage supply. Considering that this home storage would otherwise maintain this energy and sell it back to the grid in the morning (at on-peak prices), and further considering that the home storage may even need to recharge itself in the morning at a on-peak prices, it should be appreciated that in this case extra privacy comes at an extra cost. Ideally, however, the privacy enhancer should encourage the user to use home resources in order to both gain privacy and save costs. The person skilled in the art will be able to implement optimisation algorithms that achieve this compromise.

Also envisaged is a smart appliances equipped with a privacy option/button. The user may then use this option/button to send a message to the privacy enhancer that the appliance concerned should be protected during its forthcoming operation. The privacy enhancer could then override its standard user privacy preferences when it determines that the appliance concerned is in operation.

While certain embodiments have been described, these embodiments have been presented by way of example only, and are not intended to limit the scope of the invention. Indeed, the novel methods and apparatus described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A system comprising:
   an input for connecting the system to a power supply via a smart meter such that the system is located on the consumer side of the smart meter;
   at least one further power source;
   at least one power consumer being a building or house or part of a building or house;
   an identifying unit arranged to identify, based on information originating from within the system, an ongoing and/or future power consumption event by the at least one power consumer;
   a power router comprising a controller and arranged to route power to the power consumer from at least one of the power supply and the at least one further power source, the power router storing rules that define at least part of the routing operation of the router; and
   a load shape generator arranged to determine a target load shape that is in conformity with one or more of the stored rules for use with a scheduled and/or a currently ongoing power consumption event, whereby the power consumption event has a load signature;
   wherein the power router is arranged to route power to said power consumer in accordance with the stored rules so that at least a part of the power consumed by the power consumer during the power consumption event is provided by the at least one power source, rather than through the input, in response to the identifying unit identifying said power consumption event, whereby a modified load signature is generated based on the load signature of said power consumption event in accordance with stored privacy rules by said power router enforcing the target load shape prior to the modified load signature being reported by the smart meter.

2. The system according to claim 1, wherein the power router further comprises a routing switch, the routing switch connected to the at least one power consumer, to the at least one further power source and to the input for routing of power to the at least one power consumer from one or more of the at least one further power source and the input, the processor arranged to control the routing switch in accordance with said stored rules.

3. The system according to claim 1, wherein the controller is arranged to control the power router so that the load signature of the power consumption event is modified through the use of power from at least one of the power sources, so that the load signature, as seen at the input is one or more of smoothed, shortened in duration, lengthened in duration and split into several distinct power consumption events, randomly scrambled, when compared to an actual load signature of the power consumption event.

4. The system according to claim 1, wherein one or more of the at least one further power source and/or of the at least one power consumer is a power storage devices, wherein the controller is further arranged to control the power router to cause the router to, during or after the end of the power consumption event, route power to a power storage device that is known to have provided power to a power consumer during a power consumption event.

5. The system according to claim 1, wherein the controller is arranged to control the power router to route power to a power consumer so that the load signature of the power consumption event, as seen at the input one or both of:
- differs from a typical load signature of the power consumer in at least one of an amplitude or intensity of the power consumed, a total amount of power consumed, a slope of an edge of the load signature, a duration of power consumption and a timing of the power consumption event; and
- corresponds to a typical load signature of a power consumer other than the power consumer consuming power in the power consumption event.

6. The system according to claim 1, wherein the stored rules comprise at least one of:
- a rule defining one or more power consumers and/or types of power consumption events for which a load signature, as seen at the input, is to be modified,
- a ranking of different power consumers and/or types of power consumption events, the ranking determining an importance of modifying a load signature associated with the ranked consumer or event type,
- rules specifying preferred times for power consumption through the input and/or for reducing overall energy consumption, and
- rules specifying power consumption preferences for one or more of the at least one further power sources.

7. The system according to claim 1, wherein the stored rules comprise:
- a first rule defining one or more power consumers and/or types of power consumption events for which a load signature, as seen at the input, is to be modified, wherein the controller is arranged to determine, based on the stored rules and for an identified power consumption event, whether or not the power router should route power to a power consumer that consumes power in the power consumption event; and/or
- a second rule specifying preferred times for power consumption through the input and wherein the controller is arranged to determine, based on the second rule, whether the power router should route power to a power consumer that consumes power in the power consumption event through the input.

8. The system according to claim 1, wherein the stored rules comprise a ranking of power consumers and/or different types of power consumption events, the ranking determining an importance of modifying a load signature associated with the ranked power consumer or event type;
wherein the controller is arranged to determine, based on the ranking and on information of two known power consumption events, whether the power router should prioritize the routing of power to one of the two power consumers that consume power in the known power consumption events.

9. The system according to claim 1, wherein the controller further comprises routing scheduler, the routing scheduler arranged to determine fraction of a total amount of power to be routed to a power consumer from one or more of the at least one further power source in scheduled future power consumption events.

10. An apparatus, wherein:
the apparatus is on the consumer side of a smart meter and arranged to control the routing of power on the consumer side of the smart meter in accordance with predetermined rules, and
the apparatus comprises:
- an output for connection to and communicating with a power router;
- an input for receiving connection information of power sources and power consumers that are located on the consumer side of the smart meter and that are connected to the power router;
- a memory arranged to store the connection information;
- an identifying unit arranged to identify an ongoing and/or future power consumption event by a said power consumer;
- a load shape generator arranged to determine a target load shape that is in conformity with one or more of the stored predetermined rules for use with a scheduled and/or a currently ongoing power consumption event, and
- a controller arranged to generate, based on said predetermined rules and in response to the identifying unit identifying said power consumption event, control signals for transmission to the power router, wherein the control signals are for controlling the power router such that at least a part of the power consumed by the said power consumer during the power consumption event is routed to the said power consumer from at least one of the power sources located on the consumer side of the smart meter, whereby a load signature of the said power consumption event is then modified in accordance with stored privacy rules by said power router to enforce the target load shape prior to the modified load signature being reported by the smart meter;
wherein said predetermined rules comprise at least one rule defining one or more power consumers and/or types of power consumption events for which power is to be provided from a said at least one power sources located on the consumer side of the smart meter and a ranking of different power consumers and/or types of power consumption events, the ranking determining an importance of modifying a load signature associated with the ranked consumer or event type.

11. A method of routing power within an end consumer of power supplied through a power grid,
wherein the method is performed on a consumer side of a smart meter and comprises:
identifying, based on information originating from within the system, an ongoing and/or future power consumption event by at least one power consumer of the end user,
in response to identifying said power consumption event:
- determining a target load shape that is in conformity with one or more stored rules for use with a scheduled and/or a currently ongoing power consumption event, and
- determining, based on the stored rules and using a controller of a power router, a routing arrangement for routing at least part of the power consumed by the at least one power consumer during the power consumption event to the at least one power consumer from at least one further power source of the end consumer, whereby a load signature of the said power consumption event is then modified in accordance with stored privacy rules by said power router to enforce the target load shape prior to the modified load signature being reported by the smart meter; and using the power router to route power to the power consumer in accordance with the determined routing arrangement.

12. The method according to claim 11, wherein identifying the power consumption event comprises one or more of:
   receiving notifications of ongoing and/or future power consumption events from a power consumer of the end consumer;
   using a sensor to detect a change in current power consumption at the end consumer.

13. The method according to claim 11, further comprising routing power to a power storage device during or after the end of the power consumption event by the power consumer to re-charge the power storage device.

14. The method according to claim 11, further comprising varying a portion of the energy provided to the power consumer from one or more further power sources and/or from the power grid over time.

15. The method according to claim 11, further comprising receiving a command from a smart meter connected to the power grid, or through the smart meter, and controlling power routing within the end consumer in accordance with the command.

16. The method according to claim 11, further comprising receiving data from a further power source and/or a power consumer of the end consumer, modifying received data in accordance with the stored rules transmitting the modified data.

17. The method according to claim 11, further comprising determining, based on stored rules defining power consumers and/or the type of power consumption events for which power routing is to be modified in a manner that influences a load signature, as seen at the power grid, created by the power consumption event, whether for an identified power consumption event the power routing should be modified.

* * * * *